(12) United States Patent
Vasileiou et al.

(10) Patent No.: US 12,098,275 B2
(45) Date of Patent: Sep. 24, 2024

(54) BIODEGRADABLE POLYMER PARTICULATES AND METHODS FOR PRODUCTION AND USE THEREOF

(71) Applicant: Xerox Corporation, Norwalk, CT (US)

(72) Inventors: Alexandros Vasileiou, Toronto (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 17/381,407

(22) Filed: Jul. 21, 2021

(65) Prior Publication Data

US 2023/0041332 A1    Feb. 9, 2023

(51) Int. Cl.
C08L 67/04    (2006.01)
C08J 3/12    (2006.01)
(Continued)

(52) U.S. Cl.
CPC .............. *C08L 67/04* (2013.01); *C08J 3/128* (2013.01); *C08K 3/32* (2013.01); *C08K 3/36* (2013.01);
(Continued)

(58) Field of Classification Search
CPC ...... C08K 3/32; C08K 3/36; C08K 2003/325; C08K 2201/003; C08K 2201/011;
(Continued)

(56) References Cited

U.S. PATENT DOCUMENTS 9,828,490 B2    11/2017    Prasitchoke et al.
10,433,543 B2    10/2019    Bardosh et al.
(Continued)

FOREIGN PATENT DOCUMENTS

CN    104448738    3/2015
EP    3760412 A1    1/2021
(Continued)

OTHER PUBLICATIONS

Extended European Search Report from corresponding EP Application No. 22184065.5 mailed Dec. 19, 2022.
(Continued)

*Primary Examiner* — Ling Siu Choi
*Assistant Examiner* — Ronald Grinsted
(74) *Attorney, Agent, or Firm* — Vorys, Sater, Seymour and Pease LLP

(57) ABSTRACT

Compositions include a plurality of polymer particulates comprising a matrix polymer and one or more types of nanoparticles selected from the group consisting of biopolymer nanoparticles, biomineral nanoparticles excluding biomineralized silica alone, and any combination thereof. Illustrative examples of such nanoparticles may include cellulose nanoparticles, hydroxyapatite nanoparticles, or any combination thereof associated with the matrix polymer. The polymer particulates may be prepared by melt emulsification. Methods include depositing such polymer particulates in a powder bed; and heating a portion of the powder bed to consolidate a portion of the polymer particulates into a consolidated part having a specified shape. The matrix polymer may be biodegradable and lose at least about 40% mass in six days in a phosphate buffer solution (0.2 M, pH 7.0) containing 0.2 mg/mL of lipase obtained from *Pseudomonas cepacia* (≥30 U/mg) and incubated at 37° C.

12 Claims, 16 Drawing Sheets

(51) Int. Cl.
  *C08K 3/32* (2006.01)
  *C08K 3/36* (2006.01)
  *C08L 1/02* (2006.01)
  *B82Y 30/00* (2011.01)
(52) U.S. Cl.
  CPC ............... *C08L 1/02* (2013.01); *B82Y 30/00* (2013.01); *C08K 2003/325* (2013.01); *C08K 2201/003* (2013.01); *C08K 2201/011* (2013.01); *C08L 2201/06* (2013.01)
(58) Field of Classification Search
  CPC .. C08J 3/128; C08L 67/04; C08L 1/02; C08L 2201/06; B82Y 30/00
  USPC .......................................................... 524/493
  See application file for complete search history.

(56) References Cited

U.S. PATENT DOCUMENTS

| 2013/0129788 | A1* | 5/2013 | Webster ................ A61L 27/34 |
| | | | 514/16.7 |
| 2018/0346667 | A1 | 12/2018 | Manat et al. |
| 2021/0070953 | A1 | 3/2021 | Resetco et al. |
| 2021/0070988 | A1 | 3/2021 | Claridge et al. |
| 2021/0070993 | A1 | 3/2021 | Farrugia et al. |

FOREIGN PATENT DOCUMENTS

| EP | 3786232 A1 | 3/2021 | |
| WO | WO-2004085998 A2 * | 10/2004 | ............. A61K 33/00 |

OTHER PUBLICATIONS

Duan B, Wang M, Zhou WY, Cheung WL, Li ZY, Lu WW. Three-dimensional nanocomposite scaffolds fabricated via selective laser sintering for bone tissue engineering. Acta Biomater. (2010).

B. Duan, M. Wang, W.Y. Zhou, W.L. Cheung, Synthesis of Ca—P nanoparticles and fabrication of Ca—P/PHBV nanocomposite microspheres for bone tissue engineering applications, Applied Surface Science, vol. 255, Issue 2, pp. 529-533 (2008).

Shuji Fufisawa et al: "Synthesis of Nanocellulose-stabilized Polymer Microparticles", 24th Annual Meeting of the Cellulose Society of Japan; Jul. 12-13, 2017, Steering Committee, 24th Annual Meeting of Cellulose Society, JP, Jul. 1, 2017 (Jul. 1, 2017), pp. 17-18.

Wijk, A., et al., "3D printing with biomaterials-towards a sustainable and circular economy," 2015, pp. 7-84, IOS Press, Amsterdam.

Shirazi, S.F.S., et al., "A review on powder-based additive manufacturing for tissue engineering: selective laser sintering and inkjet 3D printing," Sci. Technol. Adv. Mater., 2015, p. 033502, 16.

Ligon, S.C., et al., "Polymers for 3D Printing and Customized Additive Manufacturing," Chem. Rev., 2017, pp. 10212-10290, 117.

Yang, Y., et al., "An Overview of Pickering Emulsions: Solid-Particle Materials, Classification, Morphology, and Applications," Front. Pharmacol., 2017, 287 (20 pp), 8.

Athukoralalage, S., "3D Bioprinted Nanocellulose Based Hydrogels for Tissue Engineering Applications: A Brief Review," Polymers, 2019, 898 (13 pp), 11.

Miao, C., et al., "Investigation of the formation mechanisms in high internal phase Pickering emulsions stabilized by cellulose nanocrystals," Phil. Trans. R. Soc. A, 2018, 2017039 (13 pp), 376.

Kumar, A., et al., "Additive Manufacturing Methods for Producting Hydroxyapatite and Hydroxyapatite-Based Composite Scaffolds: A Review, "Front. Mater., 2019, 313 (20 pp), 6.

Fakra, S.C., et al., "Correlative Cyrogenic Spectromicroscopy to Investiage Selenium Bioreduction Products," Environ. Sci. Tech., 2018, pp. 503-512, 52.

Anwar, A., et al., "Low-Temperature Synthesis and Surface Modification of High Surface Area Calcium Hydroxyapatite Nanorods Incorporating Organofunctionalized Surfaces," J. Phys. Chem. C, 2016, pp. 29069-29076, 120.

* cited by examiner

| Laser Power (%) | Comp. Ex.2 | Example 1 | Example 2 |
|---|---|---|---|
| 20 | | | |
| 25 | | | |
| 30 | | | |
| 35 | | | |
| 40 | | | |

FIG. 12

BIODEGRADABLE POLYMER PARTICULATES AND METHODS FOR PRODUCTION AND USE THEREOF

BACKGROUND

Additive manufacturing, also known as three-dimensional (or 3-D) printing, is a rapidly growing technology area. While additive manufacturing has traditionally been used for rapid prototyping activities, this technique is being increasingly employed for producing commercial and industrial objects, which may have entirely different structural and mechanical tolerances than do rapid prototypes.

Additive manufacturing operates by depositing either 1) small droplets or streams of a melted or solidifiable material or 2) powder particulates in precise deposition locations for subsequent consolidation into a larger object, which may have any number of complex shapes. The larger object may be referred to as a "consolidated body" or "part" herein. Such deposition and consolidation processes typically occur under the control of a computer to afford layer-by-layer buildup of the larger object. In a particular example, consolidation of powder particulates may take place in an additive manufacturing system using a laser to promote selective laser sintering (SLS). Incomplete interlayer fusion during selective laser sintering may result in structural weak points, which may be problematic for printing objects having exacting structural and mechanical tolerances.

Powder particulates usable in additive manufacturing include thermoplastic polymers (including thermoplastic elastomers), metals, and other solidifiable substances. Although a wide array of thermoplastic polymers are known, there are relatively few having properties compatible for use in current additive manufacturing printing techniques, particularly when using Powder Bed Fusion (PBF) and other additive manufacturing techniques such as Selective Laser Sintering (SLS), Electron Beam Melting (EBM), Binder Jetting and Multi-Jet Fusion (MJF) to promote particulate consolidation. In SLS printing methods, the powder particulates may be consolidated together using energy from a high-power laser. Typical thermoplastic polymers suitable for use in three-dimensional printing include those having sharp melting points and recrystallization points about 30 to about 50° C. below the melting point. This temperature difference may allow more effective coalescence between adjacent polymer layers to take place, thereby promoting improved structural and mechanical integrity. Among thermoplastic polymers possessing these characteristics and having exhibited some successful use in three-dimensional printing processes include, for example, crystalline polyamides, polyurethanes, and polyether block amides.

For good printing performance to be realized, powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates are often indicative of the powder particulates existing as non-agglomerated, substantially individual particulates, which may be characteristic of ready powder flow and lower values of the angle of repose. A relatively narrow particulates size distribution, regularity of the particulate shape, and low Hausner ratio in a sample may also aid in promoting good powder flow performance.

Commercial powder particulates are often obtained by cryogenic grinding or precipitation processes, which can result in irregular particulate shapes and wide particulate size distributions. Irregular particulate shapes may result in poor powder flow performance during additive manufacturing printing processes. In addition, powder particulates having extensive shape irregularity, especially those obtained from current commercial processes, may afford poor packing efficiency following deposition during additive manufacturing, thereby resulting in void formation in a printed object due to the powder particulates not packing closely together during deposition and consolidation. Wide particulate size distributions may be similarly problematic in this regard. Although poor powder flow performance may be addressed to some degree through dry blending with fillers and flow aids, these techniques may have limited effectiveness with softer polymer materials, such as elastomers, due to particulate agglomeration. Moreover, fillers and flow aids may do little to improve poor packing efficiency of irregular-shaped powder particulates.

Thermoplastic particulates may also be formed by melt emulsification processes, such as those described in U.S. Pat. No. 4,863,646, which is incorporated herein by reference in its entirety. In melt emulsification processes, a thermoplastic polymer is dispersed as liquefied droplets in a carrier fluid, in which the thermoplastic polymer has no or minimal solubility above the polymer's melting point or softening temperature. Upon cooling the liquefied droplets below the melting point or softening temperature, thermoplastic particulates having a substantially spherical shape may be formed, albeit with a wide particulate size distribution. As such, the thermoplastic particulates produced in conventional melt emulsification processes may remain non-ideally suited for three-dimensional printing processes.

The size distribution of thermoplastic particulates formed during melt emulsification can be narrowed significantly by incorporating a plurality of nanoparticles into the carrier fluid as emulsion stabilizers, as described in U.S. Patent Application Publication 2021/0070093 and incorporated herein by reference. Various types of silica nanoparticles and other inorganic nanoparticles may be particularly desirable in this regard. Thermoplastic particulates formed in this manner may feature at least a partial coating of nanoparticles upon the particulate surface, wherein the nanoparticles are robustly adhered to and/or embedded in the particulate surface. The adhered/embedded nanoparticles may promote much better powder flow performance than that obtained when dry blending a flow aid with uncoated thermoplastic particulates. The narrow particulate size distribution of thermoplastic particulates having a nanoparticle coating thereon may allow ready sintering with a manageable amount of void formation to be realized in many instances. Although a wide range of printed objects may be formed satisfactorily with silica-coated thermoplastic particulates, there are certain instances where incorporation of silica or other inorganic nanoparticles in a printed object may be undesirable. For example, excessive silica or inorganic nanoparticles may compromise the mechanical performance of a printed object in some instances. Even more significantly, for thermoplastic polymers exhibiting biodegradability, the silica may compromise biodegradation performance.

SUMMARY

The present disclosure generally relates to polymer particulates and methods of making and using the same, including the preparation and use of polymer particulates having biodegradability and/or incorporating emulsion stabilizers having a biological origin or inspiration, and which are formable through melt emulsification.

In some aspects, compositions of the present disclosure comprise a plurality of polymer particulates comprising a matrix polymer and one or more types of nanoparticles selected from the group consisting of biopolymer nanoparticles, biomineral nanoparticles excluding biomineralized silica alone, and any combination thereof. The one or more types of nanoparticles may include cellulose nanoparticles, hydroxyapatite nanoparticles, or any combination thereof. Parts may be formed through consolidation of the polymer particulates in a powder bed.

In other aspects, methods of the present disclosure comprise depositing such polymer particulates in a powder bed; and heating a portion of the powder bed to consolidate a portion of the polymer particulates into a consolidated part having a specified shape.

In still other aspects, compositions of the present disclosure comprise a plurality of polymer particulates comprising a biodegradable matrix polymer and oxide nanoparticles disposed upon an outer surface of the polymer particulates; wherein the biodegradable matrix polymer loses at least about 40% mass in six days in a phosphate buffer solution (0.2 M, pH 7.0) containing 0.2 mg/mL of lipase obtained from *Pseudomonas cepacia* (≥30 U/mg) and incubated at 37° C. Parts may be formed through consolidation of the polymer particulates in a powder bed.

In still other aspects, compositions of the present disclosure include a plurality of polymer particulates comprising a biodegradable matrix polymer and one or more types of nanoparticles selected from the group consisting of biopolymer nanoparticles, biomineral nanoparticles excluding biomineralized silica alone, and any combination thereof; wherein the biodegradable matrix polymer loses at least about 40% mass in six days in a phosphate buffer solution (0.2 M, pH 7.0) containing 0.2 mg/mL of lipase obtained from *Pseudomonas cepacia* (≥30 U/mg) and incubated at 37° C. The one or more types of nanoparticles may include cellulose nanoparticles, hydroxyapatite nanoparticles, or any combination thereof. Parts may be formed through consolidation of the polymer particulates in a powder bed.

In still other aspects, methods of the present disclosure include combining a matrix polymer and a plurality of emulsion stabilizers with a carrier fluid at a heating temperature at or above a melting point or softening temperature of the matrix polymer; wherein the matrix polymer and the carrier fluid are substantially immiscible at the heating temperature; and wherein the matrix polymer is biodegradable and/or the plurality of emulsion stabilizers comprise one or more types of nanoparticles selected from the group consisting of biopolymer nanoparticles, biomineral nanoparticles excluding biomineralized silica alone, and any combination thereof; applying sufficient shear to disperse the matrix polymer as liquefied droplets in the presence of the emulsion stabilizers in the carrier fluid at the heating temperature; cooling the carrier fluid to at least a temperature at which a plurality of polymer particulates form from the liquefied droplets, the plurality of polymer particulates comprising the matrix polymer and the emulsion stabilizers; and separating the polymer particulates from the carrier fluid. The one or more types of nanoparticles may include cellulose nanoparticles, hydroxyapatite nanoparticles, or any combination thereof.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

FIG. 12 shows optical microscopy images of sintered single layers prepared from a comparative sample of polymer particulates.

DETAILED DESCRIPTION

Figure 1:
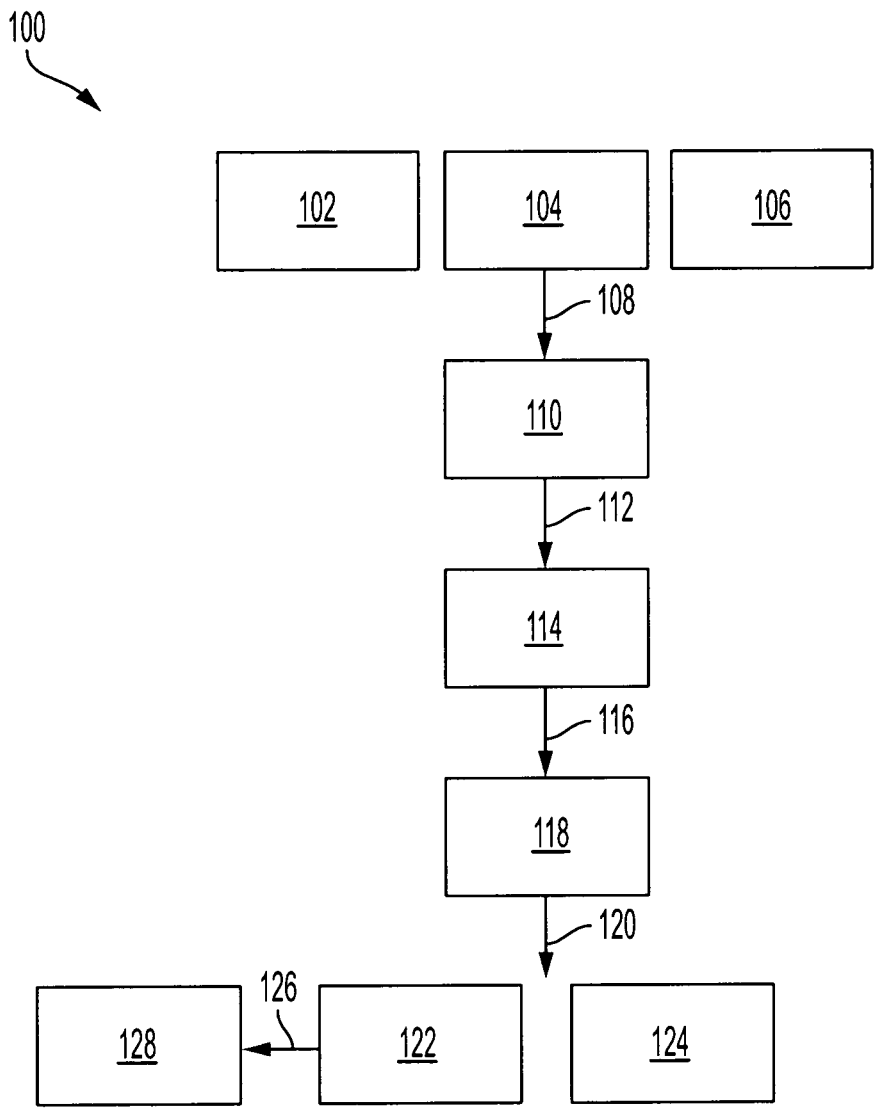
FIG. 1 is a flow diagram of a non-limiting example method for producing polymer particulates in accordance with the present disclosure.
Figure 2A:
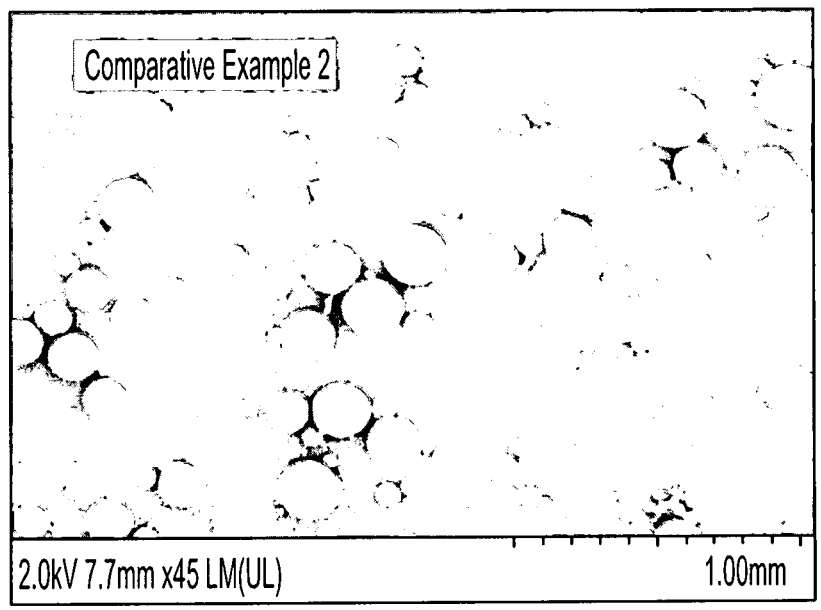
FIG. 2A to 2D show scanning electron micrographs of polycaprolactone polymer particulates prepared with silica nanoparticles in accordance with the present disclosure.
Figure 2B:
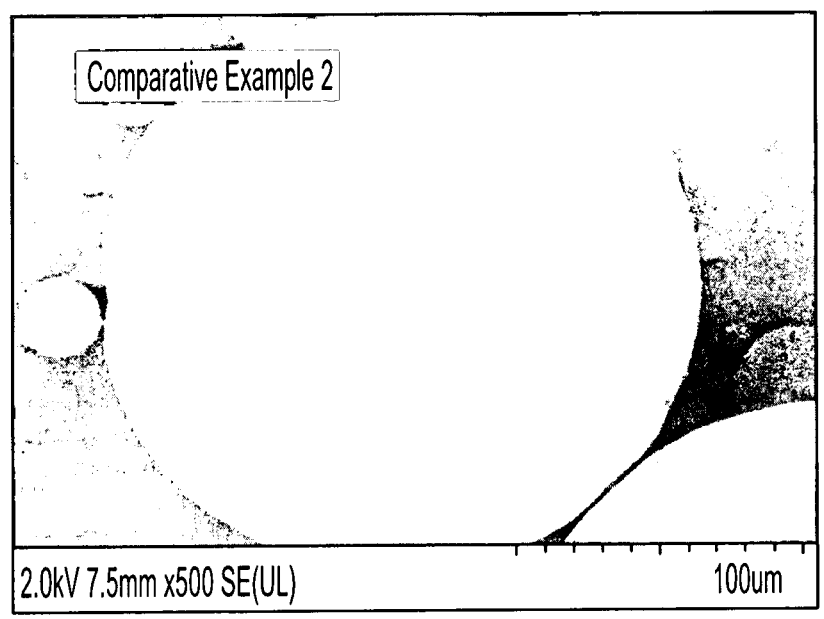
Figure 2C:
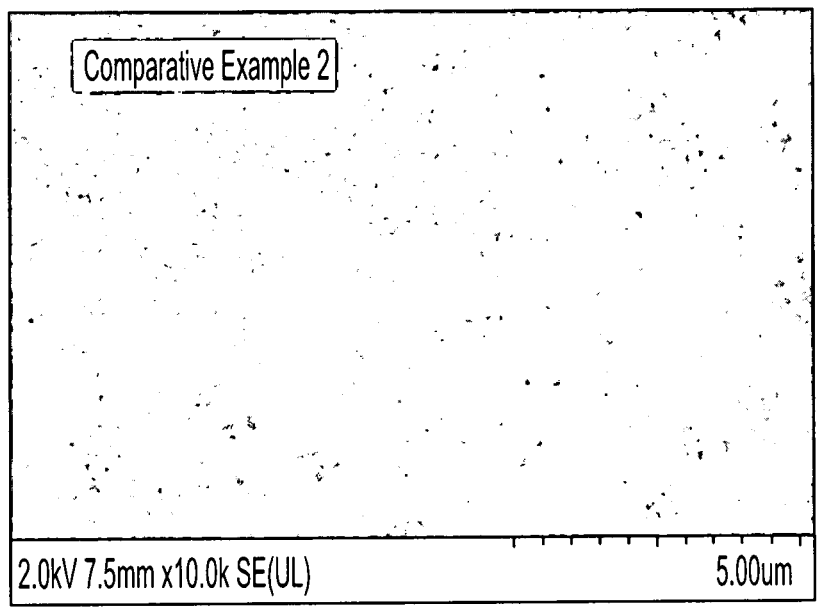
Figure 2D:
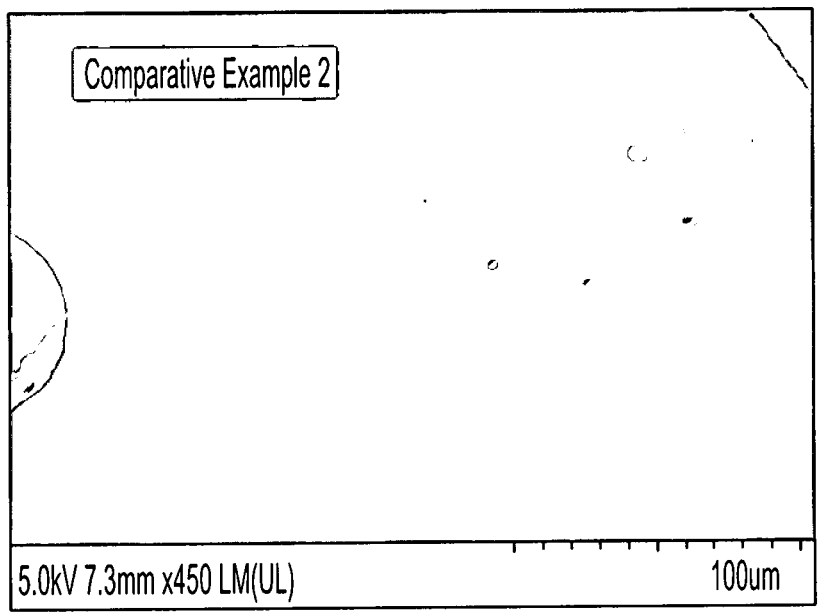
Figure 3A:
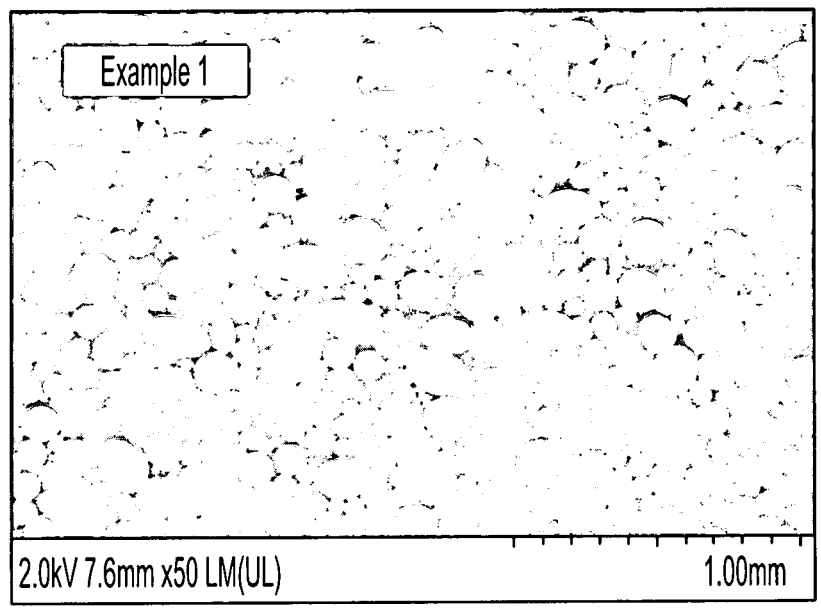
FIG. 3A to 3D show scanning electron micrographs of polycaprolactone polymer particulates prepared with cellulose nanoparticles in accordance with the present disclosure.
Figure 3B:
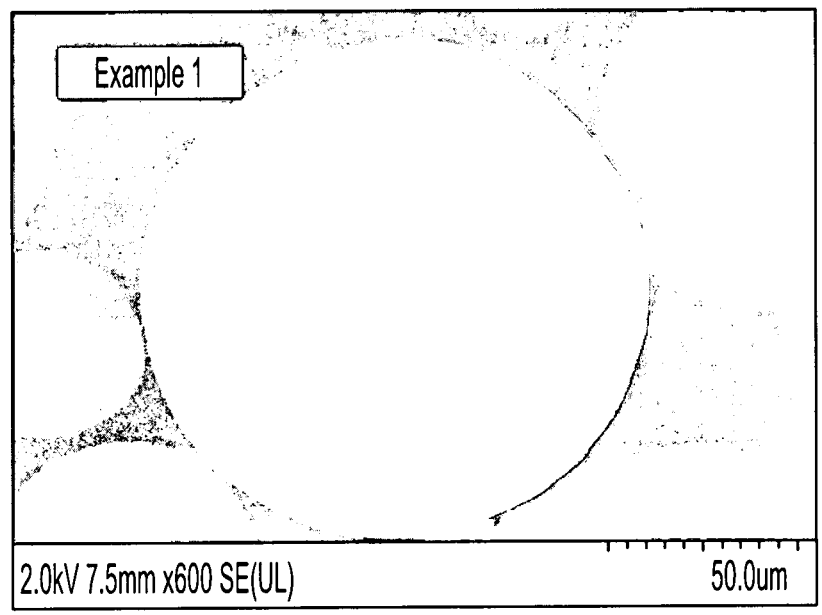
Figure 3C:
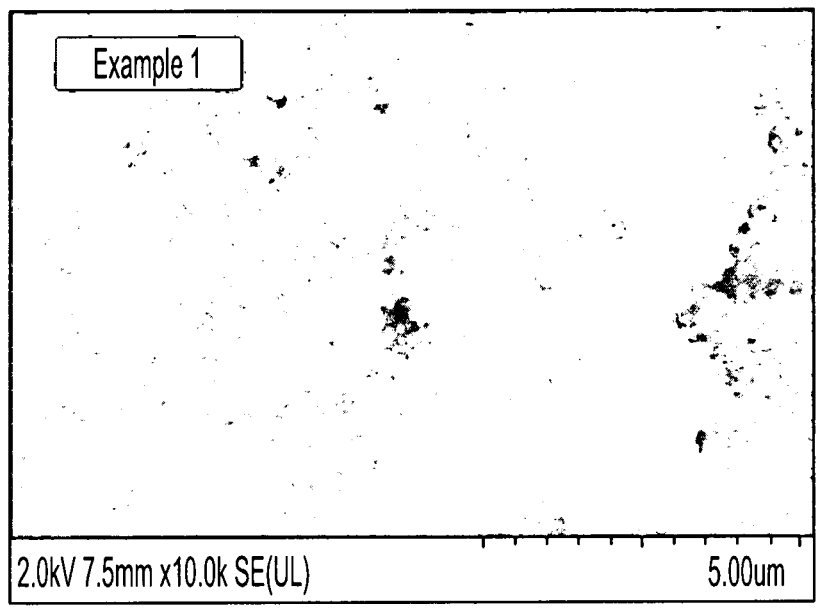
Figure 3D:
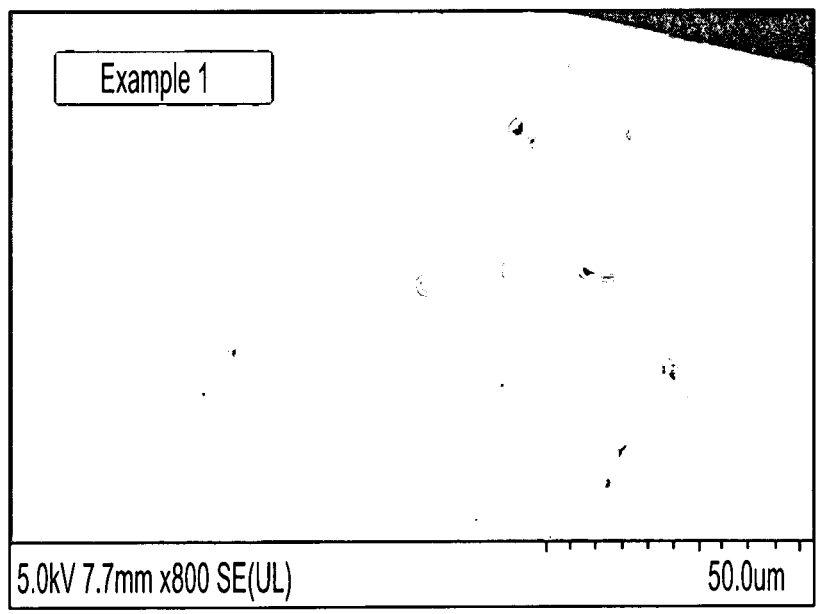
Figure 4A:
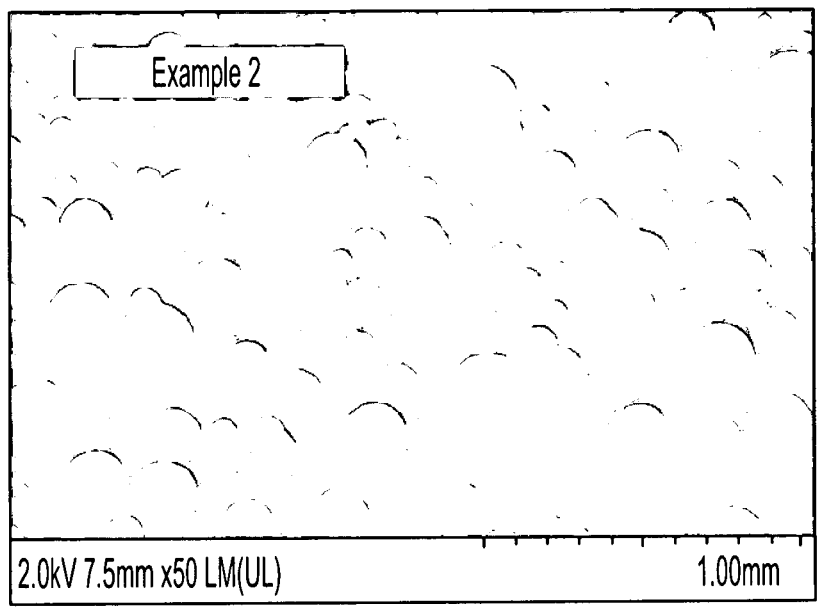
FIG. 4A to 4D show scanning electron micrographs of polycaprolactone acid polymer particulates prepared with hydroxyapatite nanoparticles in accordance with the present disclosure.
Figure 4B:
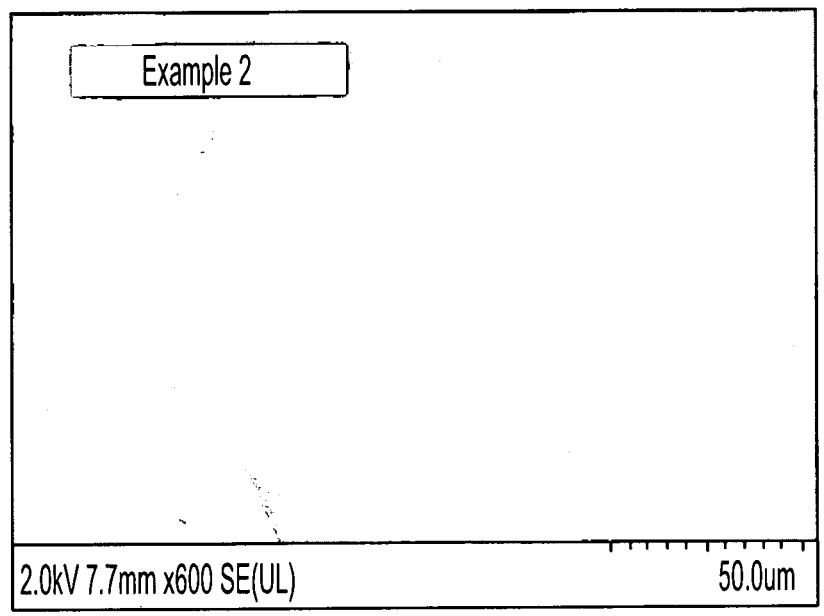
Figure 4C:
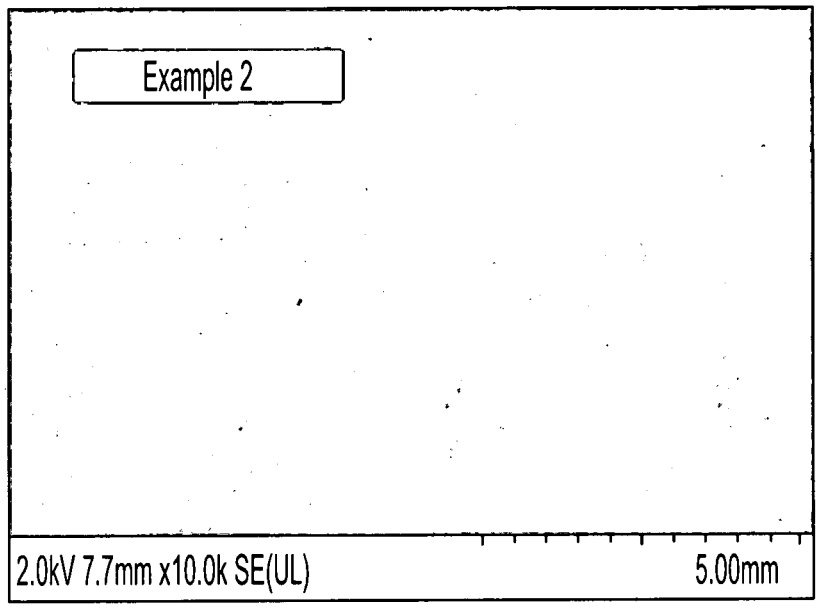
Figure 4D:
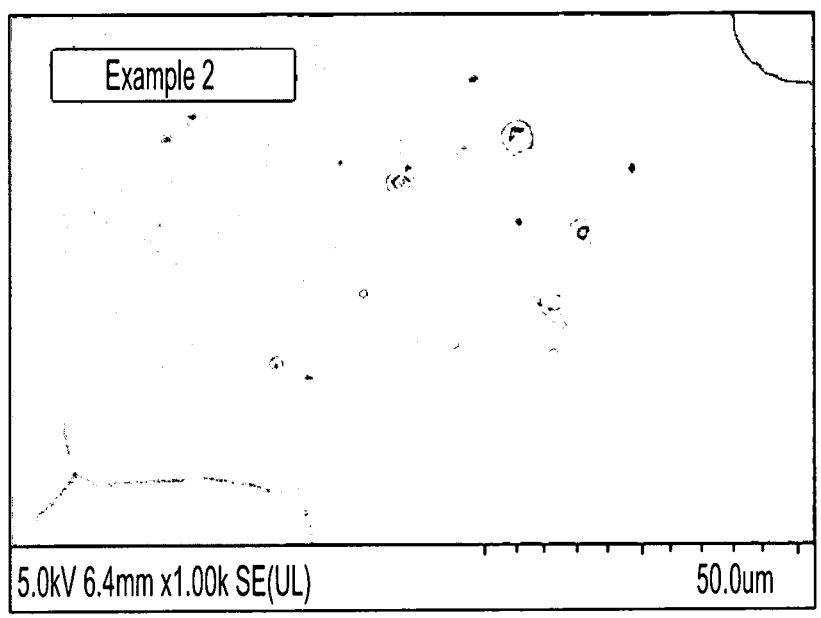
Figure 5A:
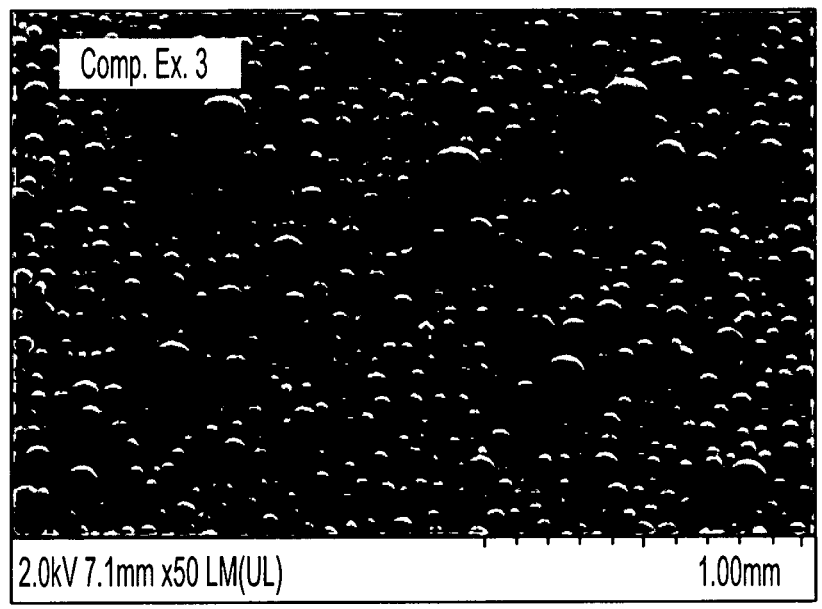
FIG. 5A to 5D show scanning electron micrographs of polylactic acid polymer particulates prepared with silica nanoparticles in accordance with the present disclosure.
Figure 5B:
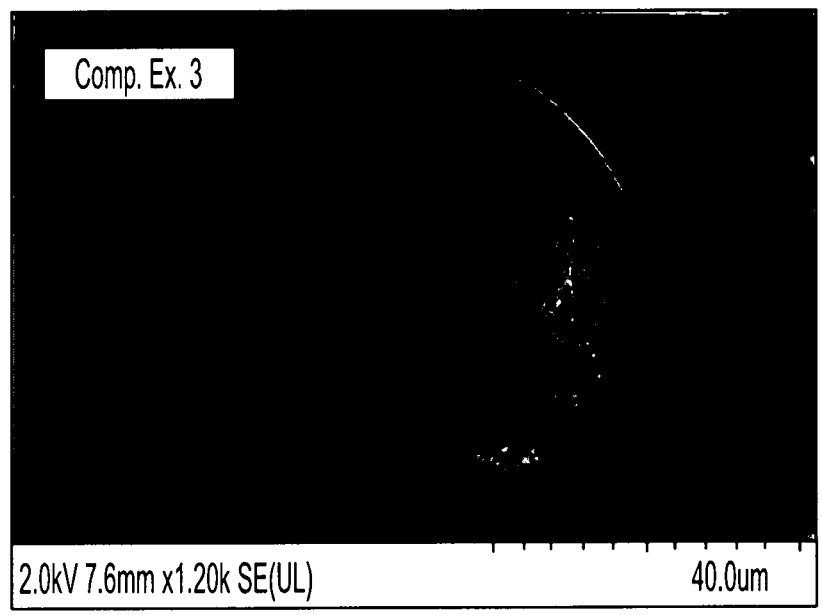
Figure 5C:
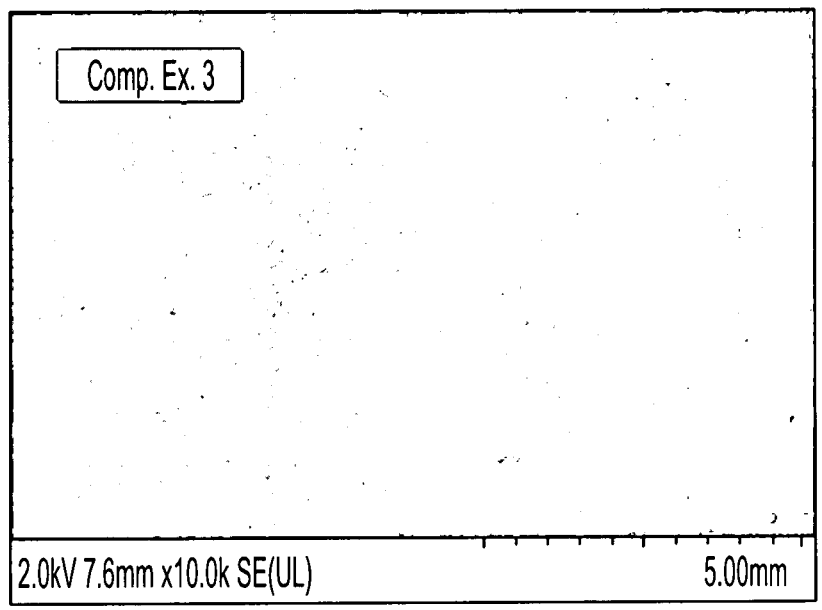
Figure 5D:
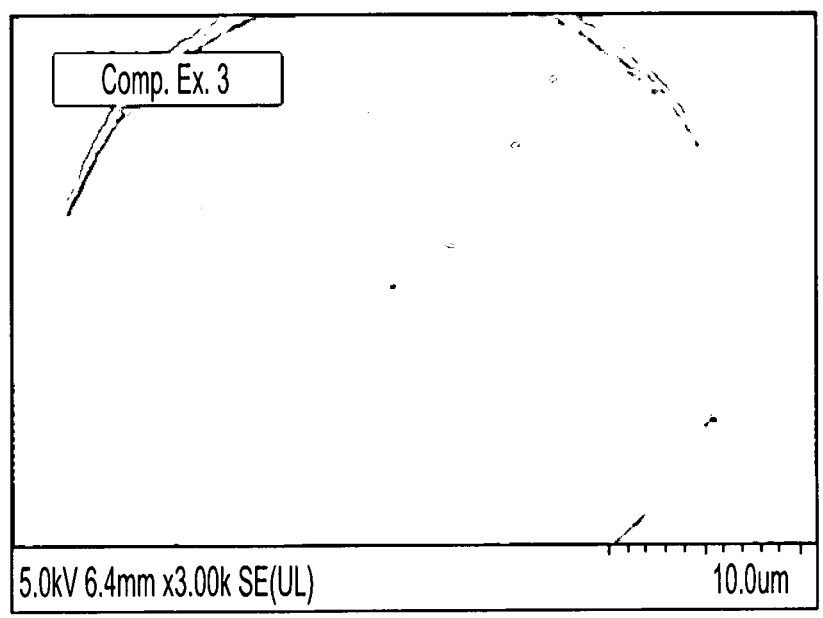
Figure 6A:
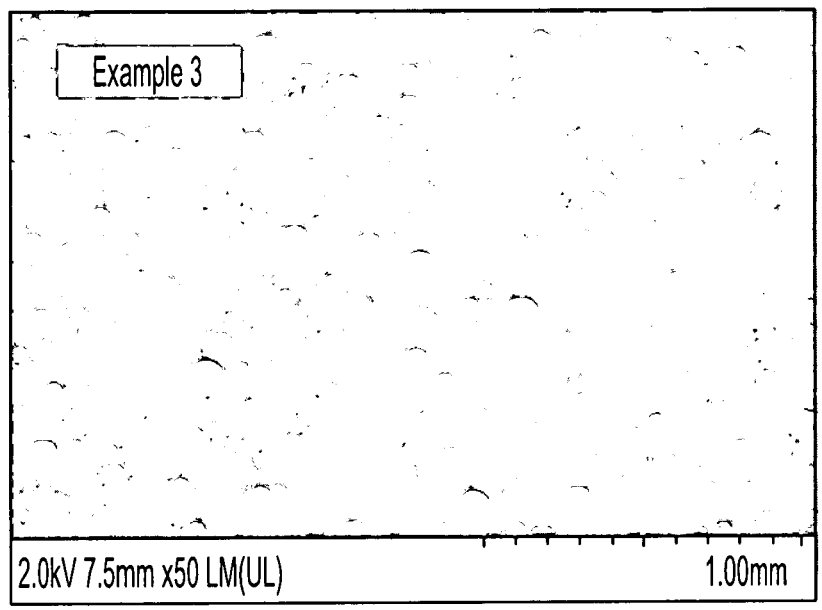
FIG. 6A to 6D show scanning electron micrographs of polylactic acid polymer particulates prepared with hydroxyapatite nanoparticles in accordance with the present disclosure.
Figure 6B:
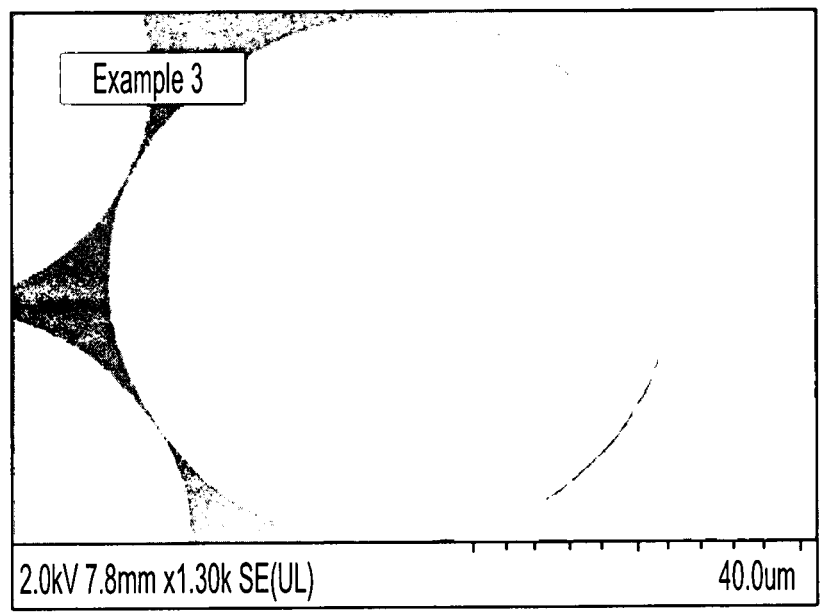
Figure 6C:
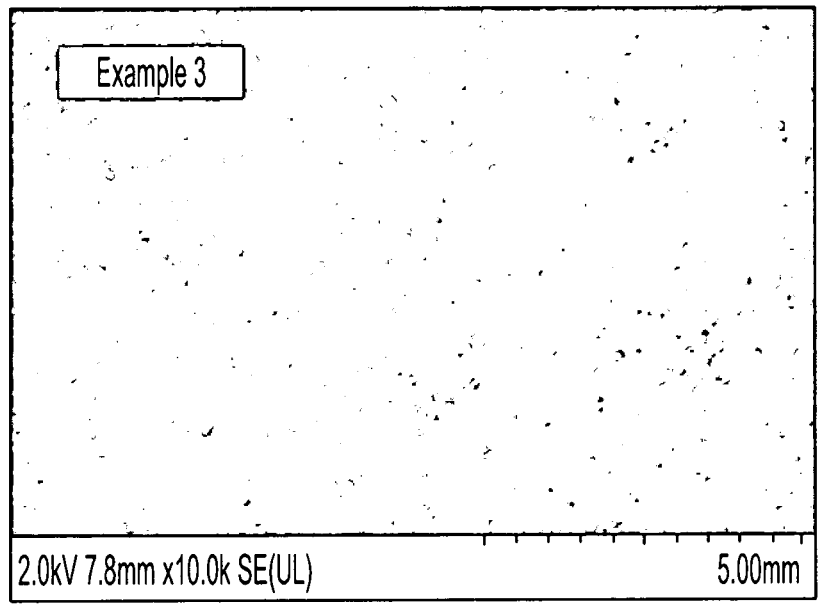
Figure 6D:
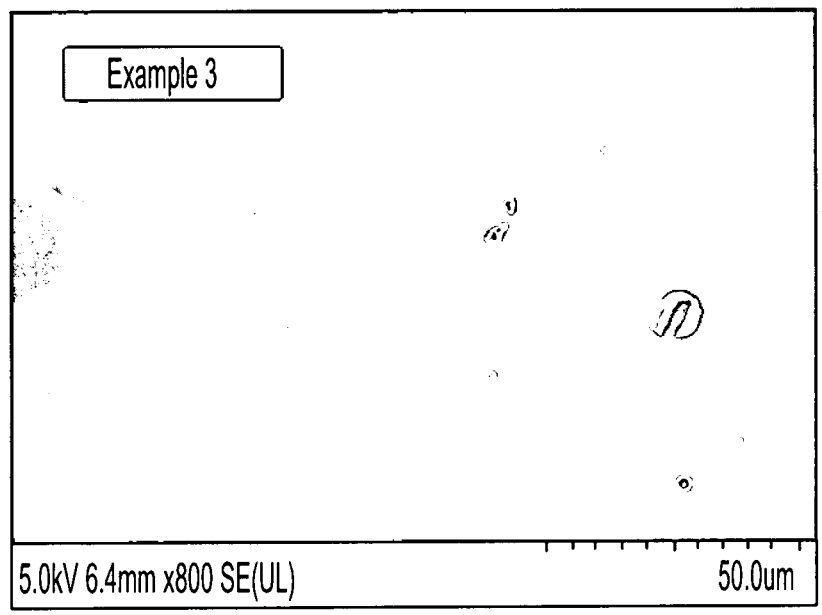
Figure 7:
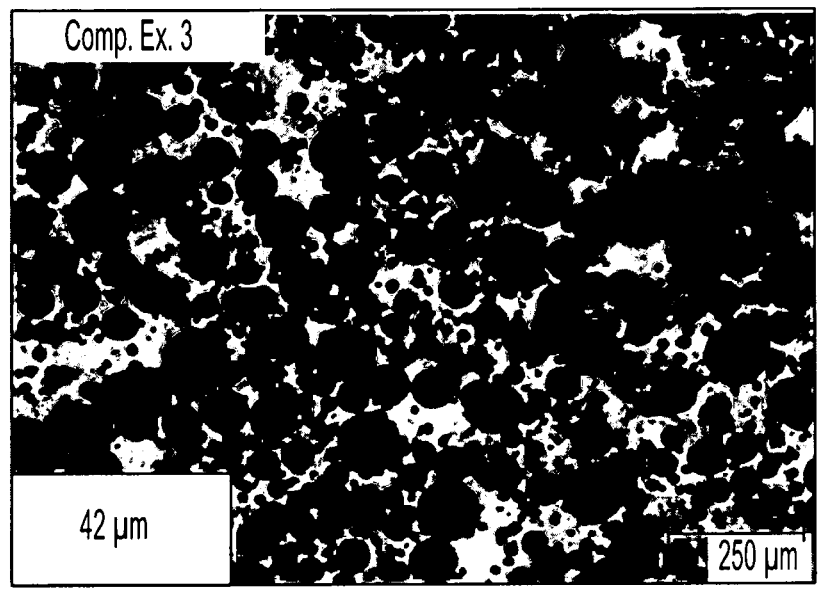
FIG. 7 shows a polarized optical microscopy image of polycaprolactone polymer particulates prepared with 2 wt. % silica nanoparticles in accordance with the present disclosure.
Figure 8:
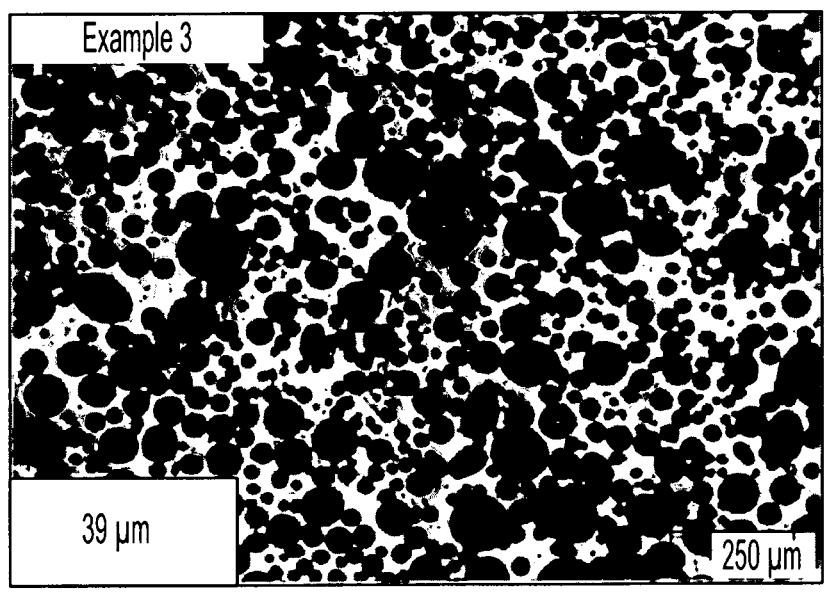
FIG. 8 shows a polarized optical microscopy image of polycaprolactone polymer particulates prepared with 2 wt. % cellulose nanoparticles in accordance with the present disclosure.
Figure 9:
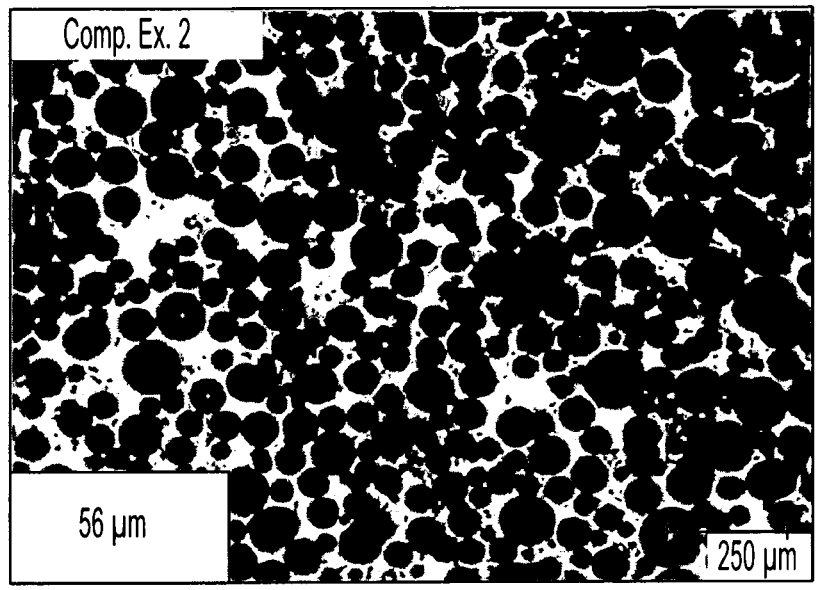
FIG. 9 shows a polarized optical microscopy image of polycaprolactone polymer particulates prepared with 2 wt. % hydroxyapatite nanoparticles in accordance with the present disclosure.
Figure 10:
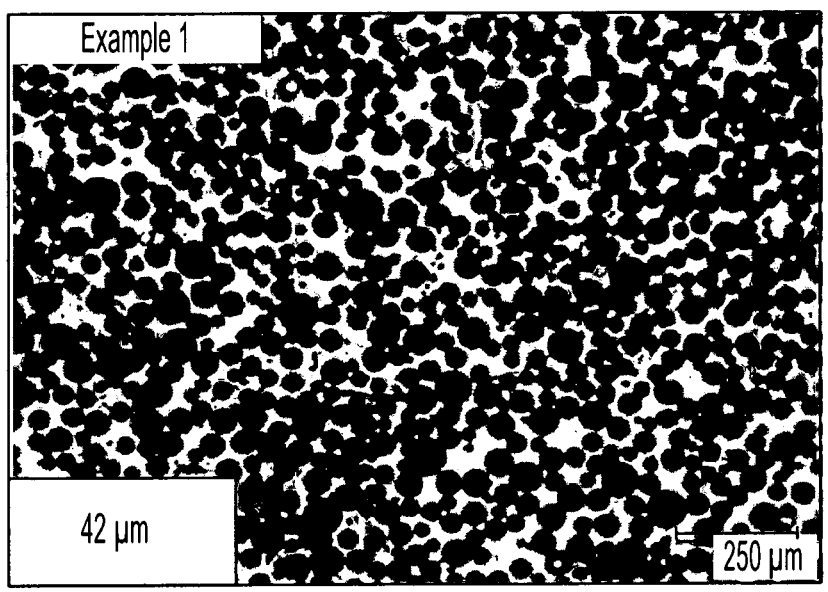
FIG. 10 shows a polarized optical microscopy image of polylactic acid particulates prepared with 1 wt. % silica nanoparticles in accordance with the present disclosure.
Figure 11:
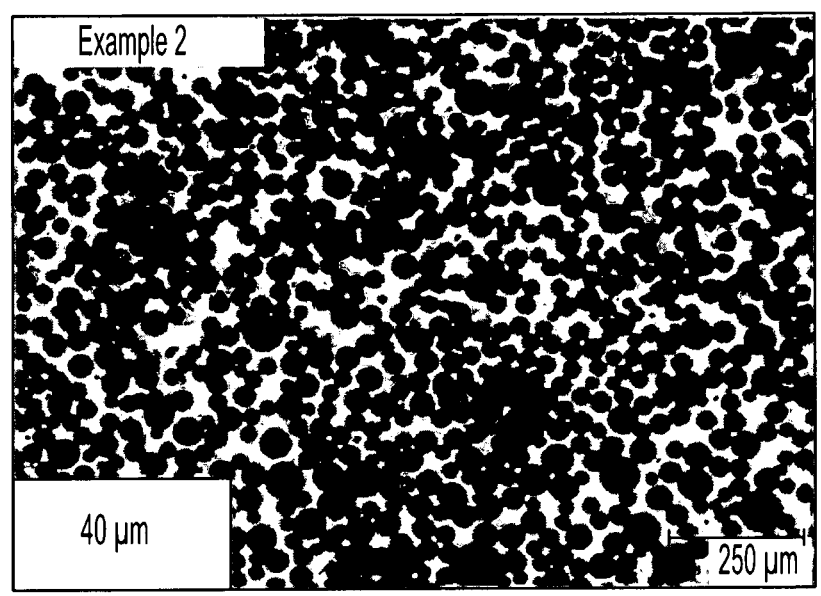
FIG. 11 shows a polarized optical microscopy image of polylactic acid polymer particulates prepared with 1 wt. % hydroxyapatite nanoparticles in accordance with the present disclosure.

The present disclosure generally relates to polymer particulates and, more specifically, to polymer particulates having biodegradability and/or incorporating emulsion stabilizers having a biological origin or inspiration, and which are formable through melt emulsification.

For a number of additive manufacturing methods, polymer feedstocks often need to meet a number of criteria for acceptable performance, including optimal ranges for particulate size, polydispersity, particulate flow, and in some cases controlled morphology and thermal properties. Complicating the issue further, commercially available powder particulates comprising thermoplastic polymers suitable for additive manufacturing are often distributed as mixtures that include irregular particulate shapes and wide particulate size distributions, which can lead to poor powder flow and deposition characteristics. Poor flow performance of powder particulates can impact packing efficiency following deposition, thereby increasing the likelihood of void formation and commensurate lack of structural and mechanical integrity in a printed object (part). While additional processing by classification and/or dry-blending with various flow aids can improve flow performance, these techniques increase material and time costs.

Polymer particulates generated by melt emulsification techniques disclosed herein may have high sphericity, good particulate size uniformity, low angle of repose values, and good flow performance characteristics. The increased handling performance and flow performance may enhance utility of the polymer particulates in a number of applications, including additive manufacturing, thermoforming, and other molding processes. Polymer particulates of the present disclosure may be used in additive manufacturing processes to increase density and reduce the incidence of void formation in printed parts, thereby promoting higher mechanical and structural integrity than is presently attainable with commercial polymer powders. Increased particulate size uniformity associated with the polymer particulates disclosed herein may also facilitate consolidation in laser sintering processes at lower laser power, principally by minimizing the occurrence of larger polymer particulates and agglomerates thereof that may require higher laser powers to promote sintering.

Advantageously, the polymer particulates and associated methods disclosed herein may feature biodegradable polymers and/or incorporate emulsion stabilizers having a biological origin or inspiration during melt emulsification. Such emulsion stabilizers may aid in maintaining biodegradation of a biodegradable matrix polymer, although they also may be used in combination with non-biodegradable matrix polymers as well. Illustrative emulsion stabilizers having a biological origin or inspiration may include biopolymer nanoparticles, biomineral nanoparticles, or any combination thereof, such as cellulose nanoparticles and/or hydroxyapatite nanoparticles. When conventional emulsion stabilizers, such as silica nanoparticles, are present, biodegradable matrix polymers may facilitate enhanced biodegradation over other types of thermoplastic polymers conventionally used in additive manufacturing processes.

Terms used in the description and claims herein have their plain and ordinary meaning, except as modified by the paragraphs below.

As used herein, the term "immiscible" refers to a mixture of components that, when combined, form two or more phases that have less than 5 wt. % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "nanoparticle" refers to a particulate material having a particulate size ranging from about 1 nm to about 500 nm.

As used herein, the terms "associated," "association," and grammatical variations thereof refer to admixture or blending of nanoparticles and a matrix polymer. Depending on type, nanoparticles may be homogenously or heterogeneously blended with a matrix polymer in the disclosure herein, inclusive of localization upon the surface of a matrix polymer. At least some nanoparticles may be associated with an outer surface of polymer particulates through physical adherence, hydrogen bonding and/or other mechanisms. However, chemical bonding may be occurring to some degree.

As used herein, the term "embed" relative to nanoparticles and a surface of a polymer particulate refers to the nanoparticles being at least partially extending into the surface such that the matrix polymer is in contact with the nanoparticles to a greater degree than would occur if the nanoparticles were simply laid on the surface of the polymer particulates.

As used herein, the term "core" refers to any portion of a polymer particulate that is below a surface layer of the polymer particulate.

As used herein, the term "thermoplastic polymer" refers to a polymer material that softens/melts and hardens/solidifies reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

Herein, $D_{10}$, $D_{50}$, $D_{90}$, and diameter span are used to describe particulate sizes. As used herein, the term "$D_{10}$" refers to a diameter with 10% of the sample (on a volume basis, unless otherwise specified) comprised of particulates having a diameter less than said diameter value. As used herein, the term "$D_{50}$" refers to a diameter with 50% of the sample (on a volume basis, unless otherwise specified) comprised of particulates having a diameter less than said diameter value. As used herein, the term "$D_{90}$" refers to a diameter with 90% of the sample (on a volume basis, unless otherwise specified) comprised of particulates having a diameter less than said diameter value.

As used herein, the terms "diameter span" and "span" and "span size" when referring to diameter provides an indication of the breadth of the particulate size distribution and is calculated as $(D_{90}-D_{10})/D_{50}$ (again, each D-value is based on volume, unless otherwise specified).

Particulate size may be determined by light scattering techniques using a Malvern MASTERSIZER™ 3000 or analysis of optical digital micrographs. Unless otherwise specified, light scattering techniques are used for analyzing particulate sizes herein. For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particulates were dispersed in air and analyzed using the AEROS dry powder dispersion module with the MASTERSIZER™ 3000. The particulate sizes were derived using instrument software from a plot of volume density as a function of size.

Particulate size measurement and diameter span can also be determined by optical digital microscopy. The optical images are obtained using a Keyence VHX-2000 digital microscope using version 2.3.5.1 software for particulate size analysis (system version 1.93).

As used herein, when referring to sieving, pore/screen sizes are described per U.S.A. Standard Sieve (ASTM E11-17).

As used herein, the terms "circularity" and "sphericity" refer to how close a particulate is to a perfect sphere. To determine circularity, optical microscopy images are taken of the particulates. The perimeter (P) and area (A) of the particulates in the plane of the microscopy image is calculated (e.g., using a SYSMEX FPIA 3000 particulate shape and particulate size analyzer, available from Malvern Instruments). The circularity of the particulates is CEA/P, where CEA is the circumference of a circle having the area equivalent to the area (A) of the actual particulates.

As used herein, the term "sintering window" refers to the difference between the melting temperature (Tm) onset and the crystallization temperature (Tc) onset, or (Tm-Tc) onset. Tm, Tm (onset), Tc, and Tc (onset) are determined by differential scanning calorimetry (DSC) per ASTM E794-06(2018) with a 10° C./min ramp rate and a 10° C./min cool rate.

In the disclosure herein, melting points may be determined by ASTM E794-06(2018) with 10° C./min ramping and cooling rates. Glass transition temperature ($T_g$) may be determined by ASTM E1356-08(2014) with 10° C./min ramping and cooling rates.

The softening temperature or softening point of a polymer, unless otherwise specified, is determined by ASTM D6090-17. The softening temperature may be measured by using a cup and ball apparatus available from Mettler-Toledo using a 0.50 gram sample with a heating rate of 1° C./min.

Angle of repose is a measure of the flowability of a powder. Angle of repose measurements are determined using a Hosokawa Micron Powder Characteristics Tester PT-R using ASTM D6393-14 "Standard Test Method for Bulk Splids" characterized by Carr Indices.

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

As used herein, the term "shear" refers to stirring or a similar process that induces mechanical agitation in a fluid.

As used herein, the term "aspect ratio" refers to length divided by width, wherein the length is greater than the width.

As used herein, the term "biodegradable polymer" refers to a polymer that can be degraded by biological entities and/or environmental conditions into the constituent oligomers and/or monomers and other byproducts, such as those having a lower molecular weight than the parent polymer. Biodegradation in accordance with the present disclosure may be assayed by preparing film from a sample of polymer particulates having dimensions of 0.5 cm×2.0 cm and about 500 μm thickness. Film samples are then placed in 5 mL of phosphate buffer solution (0.2 M, pH 7.0) containing 0.2 mg/mL of lipase obtained from *Pseudomonas cepacia* (≥30 U/mg) and incubated at 37° C. throughout the measurement. To be classified as biodegradable, polymer particulates disclosed herein may lose a percentage of mass in six days under the stated conditions of at least about 40%, or at least about 50%, or at least about 60%, or at least about 80%. Polymer particulates and articles formed therefrom may also be regarded as biodegradable according to ISO 20200 (2015), an international standardized test for polymer disintegration within a laboratory composting environment.

As used herein, the term "biopolymer" refers to a macromolecule containing a plurality of repeating monomer units that is synthesized by a biological organism. Synthetic variants are also encompassed by the term "biopolymer," provided that the synthetic biopolymer is functionally similar to a corresponding natural biopolymer.

As used herein, the term "biomineral" refers to an inorganic compound or a composite of an inorganic compound that is mineralized by a biological organism. Synthetic variants are also encompassed by the term "biomineral," provided that the synthetic biomineral is functionally similar to a corresponding natural biomineral.

Polymer particulates disclosed herein may be produced through melt emulsification in which a matrix polymer is dispersed in a carrier fluid acting as an external phase, while particulates of the matrix polymer are emulsified with the aid of an emulsion stabilizer comprising a plurality of nanoparticles. In addition to promoting emulsion integrity, emulsion stabilizers can also be embedded upon the surface of polymer particulates, which can impart beneficial mechanical properties for the polymer particulates and articles formed therefrom. By tuning the hydrophobic/hydrophilic association with the matrix polymer, emulsion stabilizers can be localized upon the surface of the polymer particulates, distributed throughout the core of the polymer particulates, or variations in between. Tuning can include pairing of matrix polymers and nanoparticles based on polarity and solubility, or through chemical modification of one or more of the species.

Polymer particulates may also have tunable biodegradability in which one or more of the matrix polymer and the nanoparticles are prepared from a biodegradable material and/or a material having a biological source or inspiration. The disclosed polymer particulates may include environmentally friendly or "green" materials such as thermoplastic polymers or nanoparticles that are biological in origin (biosourced, which is inclusive of bio-derived materials) and/or recycled. The incorporation of various types of nanoparticles can also be used to control biodegradability. For example, polymer particulates may incorporate bio-sourced, bio-inspired and/or biodegradable nanoparticles to increase various environmentally beneficial aspects of the polymer particulates. Such types of nanoparticles may include, for example, biopolymer nanoparticles (e.g., polysaccharide nanoparticles, such as cellulose nanoparticles, starch nanoparticles, chitosan nanoparticles, lignin nanoparticles, cyclodextrin nanoparticles, and the like; protein nanoparticles; and the like) and/or biomineral nanoparticles (e.g., hydroxyapatite, silica, magnetite, ferrite, calcium carbonate, calcium phosphate, the like, and composites of one or more of these biominerals with a biopolymer). Optionally, silica nanoparticles or other oxide nanoparticles may also be incorporated upon the polymer particulates to improve economics and/or modify the overall hydrophobicity of the nanoparticle coating upon the polymer particulates.

Polymer particulates disclosed herein may be prepared by heating a matrix polymer in the presence of a carrier fluid that acts as a melt emulsification medium to form discrete polymer particulates. Melt emulsification in the disclosure herein is also performed in the presence of emulsion stabilizers that associate with (and/or embed within) the forming polymer particulates, which can influence the particulate size and shape as solidified polymer particulates form.

FIG. 1 is a flow diagram of a non-limiting example melt emulsification method 100 for producing polymer particulates in accordance with the present disclosure. As shown, matrix polymer 102, carrier fluid 104, and emulsion stabilizer 106 are combined 108 to produce mixture 110.

Matrix polymer 102, carrier fluid 104, and one or more types of emulsion stabilizer 106 may be combined 108 in any order and include mixing and/or heating during the process of being combined 108. In a particular example, carrier fluid 104 may be heated above a melting point or softening temperature of matrix polymer 102 before combining 108 matrix polymer 102 with emulsion stabilizer 106. Matrix polymer 102 and carrier fluid 104 may be chosen such that these components are immiscible or substantially immiscible (<5 wt. % solubility), particularly <1 wt. % solubility, at the various processing temperatures (e.g., from room temperature to the temperature at which liquefied droplets are formed and maintained as two or more phases).

Loading (concentration) of matrix polymer 102 in carrier fluid 104 may vary over a wide range. In non-limiting examples, the loading of matrix polymer 102 in carrier fluid 104 may range from about 1 wt. % to about 99 wt. % relative to the weight of carrier fluid 104. In more particular examples, the loading of matrix polymer 104 may range from about 5 wt. % to about 75 wt. %, or about 10 wt. % to about 60 wt. %, or about 20 wt. % to about 50 wt. %, or about 20 wt. % to about 30 wt. %, or about 30 wt. % to about 40 wt. %, or about 40 wt. % to about 50 wt. %, or about 50 wt. % to about 60 wt. %. Matrix polymer 104 may be present in an amount ranging from about 5 wt. % to about 60 wt. %, or about 5 wt. % to about 25 wt. %, or about 10 wt. % to about 30 wt. %, or about 20 wt. % to about 45 wt. %, or about 25 wt. % to about 50 wt. %, or about 40 wt. % to about 60 wt. % relative to a combined amount of matrix polymer 102 and carrier fluid 104 (solids loading).

Heating above the melting point or softening temperature of matrix polymer 102 may be at any temperature below the decomposition temperature or boiling point of any of the components in mixture 110. In non-limiting examples, heating at a temperature of about 1° C. to about 50° C., or about 1° C. to about 25° C., or about 5° C. to about 30° C., or about 20° C. to about 50° C. above the melting point or softening temperature of matrix polymer 102 may be conducted. Melting points or softening temperatures for matrix polymer 102 may range from about 50° C. to about 400° C. Matrix polymer 102 may have a glass transition temperature $T_g$ of about −50° C. to about 400° C., or about −50° C. to about 0° C., or about −25° C. to about 50° C., or about 0° C. to about 150° C., or about 100° C. to about 250° C., or about 150° C. to about 300° C., or about 200° C. to about 400° C.

Mixture 110 is then processed 112 by applying sufficient shear to produce liquefied droplets of matrix polymer 102 at a temperature greater than the melting point or softening temperature of matrix polymer 102, thereby forming melt emulsion 114. Without being limited by theory, it is believed that, all other factors being the same, increasing shear may decrease the size of liquefied matrix polymer droplets in carrier fluid 104. It is to be understood that at some point there may be diminishing returns on increasing shear and decreasing the droplet size in turn and/or disruptions to the droplet contents that decrease the quality of particulates produced therefrom. Examples of mixing apparatuses used for producing melt emulsion 114 include, but are not limited to, extruders (e.g., continuous extruders, batch extruders and the like), stirred reactors, blenders, reactors with inline homogenizer systems, and the like, and apparatuses derived therefrom.

In non-limiting examples, the liquefied droplets may have a size of about 1 μm to about 1,000 μm, or about 1 μm to about 500 μM, or about 1 μm to about 150 μm, or about 1 μm to about 130 μm, or about 1 μm to about 100 μm, or about 10 μm to about 100 μm, or about 20 μm to about 80 μm, or about 20 μm to about 50 μm, or about 50 μm to about 90 μm. Particulate size measurements may be made by analysis of optical images or using onboard software of a Malvern MASTERSIZER 3000 Aero S instrument, which uses light scattering techniques for particulates size measurement.

Shear sufficient to form liquefied droplets may be applied through stirring carrier fluid 104 in particular examples of the present disclosure. In non-limiting examples, the stirring rate may range from about 50 rotations per minute (RPM) to about 1500 RPM, or about 250 RPM to about 1000 RPM, or about 225 RPM to about 500 RPM. The stirring rate while melting the matrix polymer may be the same as or different than the stirring rate used once liquefied droplets have formed. The liquefied droplets may be stirred over a stirring time of about 30 seconds to about 18 hours or longer, or about 1 minute to about 180 minutes, or about 1 minute to about 60 minutes, or about 5 minutes to about 6 minutes, or about 5 minutes to about 30 minutes, or about 10 minutes to about 30 minutes, or about 30 minutes to about 60 minutes.

Melt emulsion 114 is then cooled 116 to solidify the liquefied droplets into polymer particulates. The cooling rate may range from about 100° C./sec to about 10° C./hr or about 10° C./sec to about 10° C./hr, including any cooling rate in between. Shear may be discontinued during cooling, or may be maintained at the same rate or a different rate during cooling. Cooled mixture 118 can then be treated 120 to isolate polymer particulates 122 from other components 124 (e.g., carrier fluid 104, excess emulsion stabilizer 106, and the like). Treatment 120 may include washing, filtering and/or the like. Polymer particulates 122 include matrix polymer 102 and at least a portion of emulsion stabilizer 106 associated therewith.

Treatment 120 to separate polymer particulates 122 from the carrier fluid 104 may take place by any of a variety of known separation techniques. Any of gravity settling and filtration, decantation, centrifugation, or the like may be used to separate polymer particulates 122 from carrier fluid 104. The polymer particulates 122 may be washed with a solvent in which carrier fluid 104 is soluble and polymer particulates 122 are insoluble in the course of the separation process. In addition, a solvent in which carrier fluid 104 is soluble and polymer particulates 122 are insoluble may be mixed with carrier fluid 104 and polymer particulates 122 before separating.

Suitable solvents for washing polymer particulates 122 or mixing with carrier fluid 104 may include, but are not limited to, aromatic hydrocarbons (e.g., toluene and/or xylene), aliphatic hydrocarbons (e.g., heptane, n-hexane, and/or n-octane), cyclic hydrocarbons (e.g., cyclopentane, cyclohexane, and/or cyclooctane), ethers (e.g. diethyl ether, tetrahydrofuran, diisopropyl ether, and/or dioxane), halogenated hydrocarbons (e.g., dichloroethane, trichloroethane, dichloromethane, chloroform and/or carbon tetrachloride), alcohols (e.g., methanol, ethanol, isopropanol, and/or n-propanol), ketones (e.g., methyl ethyl ketone and/or acetone); esters (e.g., ethyl acetate and the like), water, the like, and any combination thereof.

After separating 120 polymer particulates 122, any of heating, vacuum drying, air drying, or any combination thereof may be performed. In some cases, polymer particulates 122 may contain a limited quantity of carrier fluid 104.

In non-limiting examples, any of polymer particulates 122 of the present disclosure may comprise a non-zero amount up to about 5 wt. % carrier fluid 104 that remains associated with polymer particulates 122. Carrier fluid 104 may be associated with the outer surface of polymer particulates 122 and/or trapped within voids or cavities within polymer particulates 122. Up to 5 vol. % voids may be present in polymer particulates 122, with the voids being filled or unfilled.

Emulsion stabilizer 106, or a portion thereof, may be embedded on the surface and/or distributed throughout polymer particulates 122 within a core thereof. In contrast, grinding and dry blending methods for generating polymer particulates with flow aids such as silica nanoparticles does not result in association or embedding of the nanoparticles upon the surface of the polymer particulates or within a core of the polymer particulates. The localization of emulsion stabilizer 106 on the surface and/or within polymer particulates 122 can be tuned by increasing or decreasing the compatibility of emulsion stabilizer 106 and/or matrix polymer 102, such as by modifying the surface of emulsion stabilizer 106 by increasing or decreasing surface hydrophobicity, or by selecting matrix polymer 102 having a higher or lower polarity. For example, emulsion stabilizer 106, such as hydroxyapatite nanoparticles and/or cellulose nanoparticles, particularly crystalline nanocellulose, can be located on both the exterior and interior (or core) of polymer particulates 122, while hydrophobic emulsion stabilizer 106, such as oxide nanoparticles, may be primarily located on the outer surface of polymer particulates 122. Other biopolymer or biomineral nanoparticles may similarly be located upon the exterior and/or within the core of polymer particulates 122.

After separating polymer particulates 122 from other components 124, further processing 126 of polymer particulates 122 may take place to afford modified polymer particulates 128. For example, polymer particulates 122 may optionally be further purified to remove larger particulates and agglomerated particulates that may have poor flow characteristics to produce modified polymer particulates 128. To narrow the particulate size distribution (or reduce the diameter span), polymer particulates 122 can be passed through a sieve having a pore size of about 10 µm to about 250 µm, or about 10 µm to about 100 µm, or about 50 µm to about 200 µm, or about 150 µm to about 250 µm, as non-limiting examples.

In yet another example, polymer particulates 122 may be blended with additives (and purified in some cases) to form modified polymer particulates 128. Examples of additives include antioxidants, acid trapping agents, stabilizer additives, flow aids, fillers or other substances intended to tailor the properties of polymer particulates 128 for an intended application. Mixing of the additives may be conducted by dry blending techniques. Suitable examples of flow aids (e.g., carbon black, graphite, silica, and the like) and similar substances will be familiar to one having ordinary skill in the art.

Accordingly, melt emulsification processes of the present disclosure may comprise: combining a matrix polymer, a carrier fluid, and an emulsion stabilizer at a heating temperature at or above a melting point or softening temperature of the matrix polymer; applying sufficient shear to disperse the matrix polymer as liquefied droplets in the presence of the emulsion stabilizer in the carrier fluid at the heating temperature; after liquefied droplets have formed, cooling the carrier fluid to at least a temperature at which polymer particulates in a solidified state form from the liquefied droplets; and separating the polymer particulates from the carrier fluid. In such processes, the matrix polymer and the carrier fluid are substantially immiscible at the heating temperature. The polymer particulates comprise the matrix polymer and a plurality of the emulsion stabilizers, in which the matrix polymer defines a core and an outer surface of the polymer particulates, and the plurality of the emulsion stabilizers are located upon at least the outer surface and/or optionally within the core. The matrix polymer may be biodegradable, as specified herein, and/or the emulsion stabilizers may comprise one or more types of nanoparticles, such as biopolymer nanoparticles, biomineral nanoparticles excluding biomineralized silica alone, or any combination thereof. In some instances, suitable examples of such nanoparticles may comprise hydroxyapatite nanoparticles, cellulose nanoparticles, or any combination thereof.

Matrix polymers suitable for use in the disclosure herein are not considered to be particularly limited. In some examples, suitable matrix polymers may have properties consistent with use in additive manufacturing. Thermoplastic polymers suited for other applications may be chosen as needed.

Suitable matrix polymers may include bio-based and partially bio-based polymers, such as polymers prepared with low or zero emission of greenhouse gases. Bio-based matrix polymers may be derived from renewable resources such as natural fats and oils, which may also include biodegradable polymers. Bio-based polymers may include those obtained from the production of biomaterials, and biologically and partially biologically derived polymers that are identical or near-identical to their fossil fuel-based counterparts and/or considered "drop-ins" or substitutes for fossil fuel-based counterparts. Synthetic variants that are functionally equivalent to bio-based and partially bio-based matrix polymers are also encompassed by the term "bio-based." Bio-based matrix polymers, particularly biodegradable matrix polymers, may be used in the manufacture of sustainable and biodegradable materials, such as in applications where waste generation is high and fast biodegradation is desired for environmentally friendly disposal.

Non-limiting examples of suitable biodegradable matrix polymers may include bio-based and biodegradable polymers such as cellulose acetate, cellulose acetate butyrate, cellulose acetate propionate, cellulose nitrate, polyhydroxyalkanoates (PHA) such as polyhydroxybutyrate (PHB), poly (3-hydroxy valerate), and poly(3-hydroxybutyrate-co-3-hydroxyvalerate), polylactic acid (PLA), polyglycolic acid (PGA), poly(ε-caprolactone) (PCL), starch, and chitosan; partially bio-based and biodegradable polymers such as polybutylene succinate, poly(butylene adipate-co-terephthalate), PLA blends, and starch blends; and fossil fuel-based and biodegradable polymers such as polybutylene succinate, poly(butylene adipate-co-terephthalate), poly(butylene succinate-co-lactide), poly(butylene succinate-co-terephthalate), poly(ε-caprolactone), polyglycolide, poly(methylene adipate-co-terephthalate), and polyvinyl alcohol. Combinations (blends) of these matrix polymers and/or copolymers thereof may also be utilized in the disclosure herein.

Non-limiting examples of non-biodegradable matrix polymers that may be combined with biodegradable, biosourced and/or bio-inspired emulsion stabilizers include bio-based polymers such as polyethylene (LDPE, LLDPE, and HDPE), polyamide (such as PA11, PA12), polyethylene terephthalate, polytrimethylene terephthalate; partially bio-based and non-biodegradable polymers such as polybutylene terephthalate, polyethylene terephthalate, polytrimethylene terephthalate, polyvinyl chloride, styrene-butadiene rubber, acrylonitrile-butadiene-styrene, polyurethane, and epoxy resin; fossil fuel-based and non-biodegradable polymers such as PE, polyethylene (LDPE, HDPE), polypropylene, polystyrene, polyvinyl chloride, acrylonitrile-butadiene-styrene, polybutylene terephthalate, polyurethane, PA6, epoxy resin, and synthetic rubber. Combinations (blends) of these matrix polymers and/or copolymers thereof may also be utilized in the disclosure herein.

Other non-biodegradable matrix polymers can include thermoplastic elastomers, natural or synthetic, which can include thermoplastic polyolefin elastomers, thermoplastic vulcanizates (also referred to as elastomeric alloys), thermoplastic polyamides, and copolymers including styrenic block copolymers, thermoplastic copolyesters, and the like. Examples of other suitable thermoplastic elastomers can be found in Handbook of Thermoplastic Elastomers, 2nd ed., B. M. Walker and C. P. Rader, eds., Van Nostrand Reinhold, New York, 1988. Examples of other suitable thermoplastic elastomers for use in the disclosure herein include, but are not limited to, elastomeric polyamides, polyesteramide, polyetheresteramide, polycarbonate-esteramide, methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, polyacrylonitriles, silicones, and the like. Non-biodegradable matrix polymers can include styrenic block copolymers having at least one block selected from the group of isoprene, isobutylene, butylene, ethylene/butylene, ethylene-propylene, and ethylene-ethylene/propylene. More specific examples of elastomeric styrenic block copolymers include, but are not limited to, poly(styrene-ethylene/butylene), poly(styrene-ethylene/butylene-styrene), poly(styrene-ethylene/propylene), poly(styrene-ethylene/propylene-styrene), poly(styrene-ethylene/propylene-styrene-ethylene-propylene), poly(styrene-butadiene-styrene), poly(styrene-butylene-butadiene-styrene), the like, and any combination thereof.

Polymer particulates disclosed herein may comprise one or more types of emulsion stabilizers that function to promote emulsion formation during melt emulsification. Nanoparticle emulsion stabilizers may stabilize and control the size and shape of polymer particulates to produce polymer particulates with high circularity, a narrow particulate size distribution, and good particulate flow properties. Depending on type, the emulsion stabilizer may become localized upon at least the surface of the polymer particulates and/or optionally within the core of the polymer particulates.

In suitable examples, polymer particulates may include one or more types of biodegradable, bio-sourced and/or bio-inspired emulsion stabilizers, such as biopolymer nanoparticles, biomineral nanoparticles excluding biomineralized silica alone, or any combination thereof. Suitable biopolymer nanoparticles may be hydrophilic and include entities such as, for example, cellulose nanoparticles (inclusive of cellulose fibers and cellulose nanocrystals), starch nanoparticles, chitosan nanoparticles, lignin nanoparticles, cyclodextrin nanoparticles, protein nanoparticles, and the like. Suitable biomineral nanoparticles may include, for example, hydroxyapatite, silica, ferrite, magnetite, calcium carbonate, calcium phosphate, and the like. Biomineral nanoparticles may have crystalline or non-crystalline morphology. Other suitable biomineral nanoparticles may include biomineral composite nanoparticles produced by a living organism using any of the foregoing materials in any combination. In some examples, the polymer particulates disclosed herein may include an emulsion stabilizer such as hydroxyapatite nanoparticles, cellulose nanoparticles (crystalline nanocellulose), and/or starch nanoparticles, which may be combined with a biodegradable or non-biodegradable matrix polymer. Preferably, such emulsion stabilizers may be used in combination with a biodegradable matrix polymer, such as those specified above.

Emulsion stabilizers suitable for use in the disclosure herein may also include biodegradable nanoparticles prepared from a variety of materials including synthesized biodegradable polymers such as poly-D-L-glycolide, poly-D-L-lactide-co-glycolide, poly-cyanoacrylate, polylactic acid, and poly-e-caprolactone; and biopolymer nanoparticles, including but not limited to, proteins, polysaccharides, chitosan, alginates, collagen, gelatin, hyaluronic acid, and the like.

Polymer particulates disclosed herein may desirably be produced without including silica nanoparticles. As such, unless otherwise specified as containing silica, the polymer particulates disclosed herein may be silica-free. Silica-free polymer particulates may also include those that are produced without using biomineralized silica alone as an emulsion stabilizer. It should be appreciated, however, that it may be advantageous to include silica nanoparticles and/or biomineralized silica in combination with one or more of biopolymer nanoparticles and/or biomineral nanoparticles other than silica in some instances.

It is to be appreciated, however, that polymer particulates disclosed herein may also include biodegradable and/or biologically sourced emulsion stabilizers that are used in combination with oxide nanoparticles that are non-biodegradable or less biodegradable. In some cases, polymer particulates may comprise non-biodegradable oxide nanoparticles, such as silica nanoparticles, alone or in combination with a biodegradable matrix polymer. Oxide nanoparticles that may be used in such embodiments may include silica nanoparticles, titania nanoparticles, zirconia nanoparticles, alumina nanoparticles, iron oxide nanoparticles, copper oxide nanoparticles, tin oxide nanoparticles, boron oxide nanoparticles, cerium oxide nanoparticles, thallium oxide nanoparticles, tungsten oxide nanoparticles, or any combination thereof. Mixed oxides such as aluminosilicates, borosilicates, and aluminoborosilicates, for example, are also encompassed by the term "oxide." The oxide nanoparticles may be hydrophilic or hydrophobic, which may be native to the nanoparticles or result from surface treatment of the nanoparticles. For example, silica nanoparticles having a hydrophobic surface treatment, like dimethylsilyl, trimethylsilyl, or the like, may be formed through reacting hydrophilic surface hydroxyl groups with a hydrophobic functionalizing agent. Hydrophobically functionalized oxide nanoparticles may be particularly desirable in the present disclosure. Unfunctionalized oxide nanoparticles may also be suitable for use as well.

Particular examples of silica nanoparticles suitable for use in the disclosure herein may be hydrophobically functionalized. Such hydrophobic functionalization may make the silica nanoparticles less compatible with water than unfunctionalized silica nanoparticles. In addition, the hydrophobic functionalization may improve dispersion of the silica nanoparticles in the carrier fluid, which may be highly hydrophobic. The hydrophobic functionalization may be non-covalently or covalently attached to a surface of the silica nanoparticles. Covalent attachment may take place, for example, through functionalization of surface hydroxyl groups on the surface of the silica nanoparticles. In a non-limiting example, silica nanoparticles may be treated with hexamethyldisilazane to afford covalent functionalization of a hydrophobic modification. Commercially available hydrophobically functionalized silica nanoparticles include, for example, Aerosil RX50 (Evonik, average particulates size=40 nm) and Aerosil R812S (Evonik, average particulates size=7 nm).

In non-limiting examples, loading of the nanoparticles in the carrier fluid may range from about 0.01 wt. % to about 10 wt. %, or about 0.05 wt. % to about 10 wt. % or about 0.05 wt. % to about 5 wt. % with respect to the weight of the matrix polymer. In more particular examples, loading of nanoparticles may range from about 0.1 wt. % to about 5 wt. %, or about 0.1 wt. % to about 2 wt. %, or about 0.25 wt. % to about 1.5 wt. %, or about 0.2 wt. % to about 1.0 wt. %, or about 0.25 wt. % to about 1 wt. %, or about 0.25 wt. % to about 0.5 wt. %. Any of biopolymer nanoparticles, biomineral nanoparticles, or oxide nanoparticles, such as silica nanoparticles, may be present in the foregoing concentration ranges. In particular examples, any of hydroxyapatite nanoparticles, cellulose nanoparticles, or oxide nanoparticles, such as silica nanoparticles, may be present in these concentration ranges. Bio-sourced or bio-inspired nanoparticles, such as hydroxyapatite and/or cellulose nanoparticles, may be present in combination with oxide nanoparticles, such as silica nanoparticles, in any weight ratio ranging from about 99:1 to about 1:99.

In non-limiting examples, the particulate size of the emulsion stabilizers may range from about 1 nm to about 100 nm. In some instances, the particulate size of the emulsion stabilizers may be up to 500 nm. When present, the particulate size of silica nanoparticles may range from about 5 nm to about 75 nm, or about 5 nm to about 50 nm, or about 5 nm to about 10 nm, or about 10 nm to about 20 nm, or about 20 nm to about 30 nm, or about 30 nm to about 40 nm, or about 40 nm to about 50 nm, or about 50 nm to about 60 nm. Any of biopolymer nanoparticles, biomineral nanoparticles, and/or oxide nanoparticles, such as silica nanoparticles, may be present in the foregoing size ranges. In particular examples, any of hydroxyapatite nanoparticles, cellulose nanoparticles, or oxide nanoparticles, such as silica nanoparticles, may be present over these particulate size ranges.

Emulsion stabilizers disclosed herein may have a BET surface area of about 10 m$^2$/g to about 500 m$^2$/g, or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g.

Upon forming polymer particulates according to the disclosure herein, at least a portion of the emulsion stabilizers may be disposed as a coating upon the outer surface of the polymer microparticulates and/or, optionally, at least a portion of the emulsion stabilizers may be present within the core of the polymer particulates. Hydroxyapatite nanoparticles and cellulose nanoparticles, in particular, may be prone toward becoming localized within the core of the polymer particulates during melt emulsification, given their increased hydrophilic character. Other types of biopolymer or biomineral nanoparticles may be capable of exhibiting similar behavior. When present as a coating, the coating may be disposed substantially uniformly or non-uniformly upon the outer surface of the polymer particulates. As used herein with respect to a coating, the term "substantially uniform" refers to even coating thickness in surface locations covered by the emulsion stabilizers, particularly the entirety of the outer surface. Coating coverage of emulsion stabilizers upon the polymer particulates may range from about 5% to about 100%, or about 5% to about 25%, or about 20% to about 50%, or about 40% to about 70%, or about 50% to about 80%, or about 60% to about 90%, or about 70% to about 100% of the surface area of the polymer particulates. Coverage may be determined by image analysis of SEM micrographs. Polymer particulates of the present disclosure may contain about 90 wt. % to about 99.5 wt. % of the matrix polymer.

Carrier fluids suitable for use in the disclosure herein include those in which the matrix polymer is substantially immiscible with the carrier fluid, the carrier fluid has a boiling point exceeding the melting point or softening temperature of the matrix polymer, and the carrier fluid has sufficient viscosity to form liquefied droplets of substantially spherical shape once the matrix polymer has undergone melting therein. Suitable carrier fluids may include, for example, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof.

Suitable carrier fluids may have a density of about 0.6 g/cm$^3$ to about 1.5 g/cm$^3$, and the matrix polymer may have a density of about 0.7 g/cm$^3$ to about 1.7 g/cm$^3$, wherein the matrix polymer has a density similar to, lower than, or higher than the density of the carrier fluid.

Particularly suitable silicone oils are polysiloxanes. Illustrative silicone oils suitable for use in the disclosure herein include, for example, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like and any combination thereof.

In non-limiting examples, the carrier fluid and the matrix polymer may be heated at a temperature of about 200° C. or above. Suitable heating temperatures may be chosen based upon the melting point or softening temperature of the matrix polymer and the boiling point of the carrier fluid. The cooling rate following formation of liquefied polymer droplets may be varied as desired. In some instances, cooling may take place with heat dissipation to the surrounding environment taking place at an innate (uncontrolled) rate once heating is discontinued. In other cases, cooling at a controlled rate (e.g., by gradually decreasing the heating temperature and/or using jacketed temperature control to increase or decrease the rate of cooling) may be employed.

Carrier fluids, such as polysiloxanes, including PDMS, may have a viscosity at 25° C. of about 1,000 cSt to about 150,000 cSt, or about 1,000 cSt to about 60,000 cSt, or about 40,000 cSt to about 100,000 cSt, or about 75,000 cSt to about 150,000 cSt. The viscosity of the carrier fluid may be obtained from commercial suppliers or it may be measured, if desired, through techniques known to persons having ordinary skill in the art.

Polymer particulates disclosed herein may have a bulk density as determined according to ASTM D6683-19 of about 0.3 g/cm³ to about 1.4 g/cm³, or about 0.3 g/cm³ to about 1.3 g/cm³, or about 0.4 g/cm³ to about 1.3 g/cm³, or about 0.5 g/cm³ to about 1.3 g/cm³, or about 0.5 g/cm³ to about 1.2 g/cm³.

Methods of preparing polymer particulates disclosed herein may result in the formation of polymer particulates that exhibit an increase of crystallization temperature in comparison with the initial matrix polymer. The crystallization temperature for polymer particulates as determined by ASTM E794-06(2018) may be greater than the crystallization temperature of the matrix polymer of at least about 2° C., about at least 5° C., or about at least 10° C.

Polymer particulates may have a $D_{10}$ of about 5 μm to about 50 μm, or about 10 μm to about 50 μm, about 10 μm to about 40 μm, about 15 μm to about 35 μm, or about 15 μm to about 25 μm, a $D_{50}$ of about 20 μm to about 150 μm, or about 25 μm to about 145 μm, or about 25 μm to about 135 μm, or about 30 μm to about 130 μm, or about 40 μm to about 120 μm, and a $D_{90}$ of about 70 μm to about 200 μm, or about 75 μm to about 190 or about 80 μm to about 180 μm, or about 90 μm to about 175 μm, wherein $D_{10}<D_{50}<D_{90}$. Polymer particulates may also have a diameter span of about 2.0 or less, about 1.7 or less, or about 1.5 or less. Polymer particulates may also have a diameter span within a range of about 0.7 to about 2.0, or about 0.7 to about 1.8, or about 0.8 to about 1.7, or about 0.9 to about 1.7. Particulate size measurements may be made using any suitable testing device, including a Malvern MASTERSIZER 3000.

It is contemplated that any average particulate diameter value range above (i.e., $D_{10}$, $D_{50}$, $D_{90}$) may be combined with any other particulate diameter value range above (i.e., a range of $D_{10}$ with a range of $D_{50}$, and/or a range of $D_{90}$) and/or combined with any diameter span range. For example, polymer particulates may have a $D_{50}$ ranging from about 30 μm to about 130 μm and a diameter span of about 1.7 or less.

Polymer particulates disclosed herein may have a decomposition temperature in a range of about 180° C. to about 400° C., about 180° C. to about 300° C., or about 180° C. to about 250° C.

Polymer particulates disclosed herein may have a circularity of about 0.7 or greater, or about 0.7 to about 0.95, or about 0.90 to about 1.0, or about 0.93 to about 0.99, or about 0.95 to about 0.99, or about 0.97 to about 0.99, or about 0.98 to 1.0.

Polymer particulates disclosed herein may have a Hausner ratio of about 1.0 to about 1.5, or about 1.0 to about 1.2, or about 1.1 to about 1.3, or about 1.2 to about 1.35, or about 1.3 to about 1.5.

Polymer particulates disclosed herein may have an angle of repose determined according to ASTM D6393-14 of about 25° to about 45°, about 25° to about 35°, or about 30° to about 40°, about 35° to about 45°.

At least a majority of the polymer particulates obtained according to the disclosure here may be substantially spherical in shape. More typically, about 90% or greater, or about 95% or greater, or about 99% or greater of the polymer particulates produced by melt emulsification according to the present disclosure may be substantially spherical in shape. In other non-limiting examples, the polymer particulates of the present disclosure may have a circularity of about 0.9 or greater, including about 0.90 to about 1.0, or about 0.93 to about 0.99, or about 0.95 to about 0.99, or about 0.97 to about 0.99, or about 0.98 to 1.0.

Polymer particulates disclosed herein may be utilized in additive manufacturing processes, particularly those employing selective laser sintering to promote particulate consolidation. Additive manufacturing processes may include Powder Bed Fusion (PBF), Selective Laser Sintering (SLS), Selective Heat Sintering (SHS), Selective Laser Melting (SLM), Electron Beam Melting (EBM), Binder Jetting, and Multi Jet Fusion (MJF).

Additive manufacturing process methods of the present disclosure may include: depositing polymer particulates of the present disclosure upon a surface in a specified shape and/or layers, and once deposited, heating at least a portion of the polymer particulates to promote consolidation thereof and form a consolidated body (object). The consolidated body may have a void percentage of about 5% or less (e.g., 0% to about 5%, or about 0.5% to about 2%, or about 1% to about 3%, or about 2% to about 5%) or less after being consolidated.

In addition to additive manufacturing, polymer particulates disclosed herein may be applicable to other manufacturing techniques including extrusion molding, coextrusion molding, extrusion coating, injection molding, injection blow molding, injection stretch blow molding, thermoforming, cast film extrusion, blown film extrusion, foaming, extrusion blow-molding, injection stretched blow-molding, rotomolding, pultrusion, calendering, additive manufacturing, lamination, electrospinning, electrospraying, and the like.

Polymer particulates disclosed herein may be used to prepare articles having enhanced elastic modulus and yield stress when compared to alternative thermoplastics such as nylon. Examples of objects formable from polymer particulates disclosed herein include containers (e.g., for food, beverages, cosmetics, personal care compositions, medicine, and the like), shoe soles, toys, furniture parts, decorative home goods, plastic gears, screws, nuts, bolts, cable ties, medical items, such as scaffolds in tissue engineering, sutures, and drug delivery systems, prosthetics, orthopedic implants, production of artifacts that aid learning in education, 3D anatomy models to aid in surgeries, robotics, biomedical devices (orthotics), home appliances, dentistry, automotive and airplane/aerospace parts, electronics, sporting goods, and the like. Polymer particulates disclosed herein can be used as a feedstock for injection molding of disposable articles, such as food packaging, bags, and earth retention sheathing. The polymer particulates may also be used in agriculture applications such as, for example, to provide degradable packaging for plants and/or as a degradable vehicle for seeds, fertilizer, herbicides, insecticides, and the like. Other applications for polymer particulates of the present disclosure may include, but are not limited to, use as a filler in paints and powder coatings, inkjet materials and electrophotographic toners, and the like.

Embodiments disclosed herein include:

A. Polymer particulate compositions incorporating biodegradable, bio-sourced and/or bio-inspired emulsion stabilizers. The compositions comprise: a plurality of polymer particulates comprising a matrix polymer and one or more types of nanoparticles selected from the group consisting of biopolymer nanoparticles, biomineral nanoparticles excluding biomineralized silica alone, and any combination thereof.

A1. The polymer particulate compositions of A, wherein the one or more types of nanoparticles comprise cellulose nanoparticles, hydroxyapatite nanoparticles, or any combination thereof.

B. Polymer particulate compositions containing a biodegradable matrix polymer.

The compositions comprise: a plurality of polymer particulates comprising a biodegradable matrix polymer and oxide nanoparticles disposed upon an outer surface of the polymer particulates; wherein the biodegradable matrix polymer loses at least about 40% mass in six days in a phosphate buffer solution (0.2 M, pH 7.0) containing 0.2 mg/mL of lipase obtained from *Pseudomonas cepacia* (≥30 U/mg) and incubated at 37° C.

C. Polymer particulate compositions containing a biodegradable matrix polymer and incorporating biodegradable and/or biologically sourced emulsion stabilizers. The compositions comprise: a plurality of polymer particulates comprising a biodegradable matrix polymer and one or more types of nanoparticles selected from the group consisting of biopolymer nanoparticles, biomineral nanoparticles excluding biomineralized silica alone, and any combination thereof; wherein the biodegradable matrix polymer loses at least about 40% mass in six days in a phosphate buffer solution (0.2 M, pH 7.0) containing 0.2 mg/mL of lipase obtained from *Pseudomonas cepacia* (≥30 U/mg) and incubated at 37° C.

C1: The polymer particulate compositions of C, wherein the one or more types of nanoparticles comprise cellulose nanoparticles, hydroxyapatite nanoparticles, or any combination thereof.

D. A part made from a polymer particulate composition of A, A1, B, C, or C1.

E. Methods of preparing polymer particulates. The methods comprise: combining a matrix polymer and a plurality of emulsion stabilizers with a carrier fluid at a heating temperature at or above a melting point or softening temperature of the matrix polymer; wherein the matrix polymer and the carrier fluid are substantially immiscible at the heating temperature; and wherein the matrix polymer is biodegradable and/or the plurality of emulsion stabilizers comprises one or more types of nanoparticles selected from the group consisting of biopolymer nanoparticles, biomineral nanoparticles, and any combination thereof; applying sufficient shear to disperse the matrix polymer as liquefied droplets in the presence of the emulsion stabilizers in the carrier fluid at the heating temperature; cooling the carrier fluid to at least a temperature at which a plurality of polymer particulates form from the liquefied droplets, the plurality of polymer particulates comprising the matrix polymer and the emulsion stabilizer; and separating the polymer particulates from the carrier fluid.

E1. The methods of E, wherein the one or more types of nanoparticles comprise cellulose nanoparticles, hydroxyapatite nanoparticles, or any combination thereof.

Each of embodiments A, A1, B, C, C1, D, E and E1 may have one or more of the following additional elements in any combination:

Element 1: wherein the polymer particulates have a $D_{50}$ ranging from about 30 μm to about 130 μm and a diameter span of about 1.7 or less.

Element 2: wherein the composition further comprises oxide nanoparticles disposed upon an outer surface of the polymer particulates.

Element 3: wherein the oxide nanoparticles comprise silica nanoparticles.

Element 4: wherein at least a portion of the one or more types of nanoparticles are present within a core of the polymer particulates.

Element 4A: wherein at least a portion of the cellulose nanoparticles or hydroxyapatite nanoparticles are present within a core of the polymer particulates.

Element 5: wherein the plurality of polymer particulates have a crystallization temperature of about at least 5° C.

greater than a crystallization temperature of the matrix polymer, each as determined by ASTM E794-06(2018).

Element 6: wherein the method further comprises depositing the composition layer-by-layer in a powder bed; and heating a portion of the powder bed to consolidate a portion of the polymer particulates into a consolidated part having a specified shape.

Element 7: wherein the composition further comprises one or more types of nanoparticles selected from the group consisting of biopolymer nanoparticles, biomineral nanoparticles, and any combination thereof.

Element 7A: wherein the composition further comprises cellulose nanoparticles, hydroxyapatite nanoparticles, or any combination thereof associated with the biodegradable matrix polymer.

Element 8: wherein at least a portion of the one or more types of nanoparticles are present within a core of the polymer particulates.

Element 8A: wherein at least a portion of the cellulose nanoparticles or hydroxyapatite nanoparticles are present within a core of the polymer particulates.

Element 9: wherein the carrier fluid comprises a silicone oil.

Element 10: wherein the biodegradable matrix polymer comprises polycaprolactone or polylactic acid.

By way of non-limiting example, exemplary combinations applicable to A, A1, B, C, C1, and D include, but are not limited to, 1 and 2; 1-3; 1, and 4 or 4A; 1 and 5; 1 and 10; 2 and 3; 2, and 4 or 4A; 2 and 10; 4 and 5; 4 and 10; and 5 and 10.

By way of non-limiting example, exemplary combinations applicable to E and E1 include Element 1 and any one or more of Elements 2 to 9; Element 2 and any one or more of Elements 1 or 3 to 9; Element 3 and any one or more of Elements 1 to 2 or 4 to 9; Element 4 and any one or more of Elements 1 to 3 or 5 to 9; Element 5 and any one or more of Elements 1 to 4 or 6 to 9; Element 6 and any one or more of Elements 1 to 5 or 7 to 9; Element 7 and any one or more of Elements 1 to 6 or 9; Element 8 and any one or more of Elements 1 to 7 or 9; and Element 9 and any one or more of Elements 1 to 8.

To facilitate a better understanding of the embodiments of the present disclosure, the following examples of preferred or representative embodiments are given. In no way should the following examples be read to limit, or to define, the scope of the disclosure.

EXAMPLES

In the examples below, flow properties of the polymer particulates were assessed using two techniques: (1) sieving and (2) the angle of repose measurements. The Sieved Yield was determined by measuring the percentage of the mass of the polymer particulates that passed through a U.S.A. Standard Sieve ASTM E11 with an opening of 250 μm (≥95% for all example polyester samples). The angle of repose was measured using the Hosokawa Micron Powder Characteristics Tester PT-R.

Comparative Example 1: PCL with 1 wt. % silica nanoparticles. In a 500 mL glass kettle equipped with heating mantle were added 280 g of PSF-30000 30000 cSt poly (dimethylsiloxane) (PDMS) from Clearco, 1.2 g Aerosil RX50 silica nanoparticle stabilizers (1 wt. %), and 120 g poly(ε-caprolactone) (PCL) from Sigma-Aldrich (Mn 80,000) (30% solids loading). An overhead stirrer was set to 300 rpm with one propeller stirrer. Repeated (3×) applications of vacuum and argon or nitrogen purges were applied to remove dissolved air and a flow of argon was kept throughout the process. The temperature was increased to 140° C. over 10 min. Once the temperature reached 140° C. the stirring speed was increased to 500 rpm. After 30 min, the glass kettle was removed from heating and stirring was stopped. The emulsion was left to cool to room temperature. The slurry was dispersed in excess heptane and vacuum filtrated. This process was carried out three times in total to remove silicone oil. The polymer particulates were dried at room temperature overnight and then sieved through a U.S.A. Standard Sieve ASTM E11 with opening of 250 µm.

Comparative Example 2: PCL with 2 wt. % silica nanoparticles. Comparative Example 2 was prepared in the manner as Comparative Example 1 with the exception that 2.4 g of Aerosil RX50 silica nanoparticle stabilizers were used (2 wt. %), as opposed to 1.2 g (1 wt. %).

Comparative Example 3: PLA with 1 wt. % silica nanoparticles. Comparative Example 3 was prepared in the manner of Comparative Example 1 with the exception that poly(L-lactide (PLA) from Ingeo (Biopolymer 3D850) was used instead of PCL. The reaction temperature was also raised to 210° C. from 140° C.

Example 1: PCL with 2 wt. % crystalline nanocellulose (CNC) nanoparticles. Example 1 was prepared in the manner of Comparative Example 1 with the exception that crystalline nanocellulose nanoparticles from CelluForce were used instead of Aerosil RX50 silica nanoparticles.

Example 2: PCL with 2 wt. % hydroxyapatite (HA) nanoparticles. Example 2 was prepared in the manner of Comparative Example 1 with the exception that hydroxyapatite nanoparticles from Sigma-Aldrich were used instead of Aerosil RX50 silica nanoparticles.

Example 3: PLA with 2 wt. % HA nanoparticles. Example 3 was prepared in the manner of Comparative Example 1 with the exception that hydroxyapatite nanoparticles from Sigma-Aldrich were used instead of Aerosil RX50 silica nanoparticles and the polymer was PLA instead of PCL.

Reaction conditions for Examples 1-3 and Comparative Examples 1-3 are summarized in Table 1.

TABLE 1

Experimental Conditions for Comparative Examples 1-3 and Examples 1-3.

| Sample Formulation | | | Process Conditions | | |
|---|---|---|---|---|---|
| Sample | Polymer | Additive | Pre-drying | Set Temp. | Max Temp. |
| Comparative Example 1 | PCL | 1 wt. % silica | 110° C./ overnight | 140° C. | 141° C. |
| Comparative Example 2 | | 2 wt. % silica | (only additive) | | 140° C. |
| Example 1 | | 2 wt. % CNC | | | 145° C. |
| Example 2 | | 2 wt. % HA | | | 147° C. |
| Comparative Example 3 | PLA | 1 wt. % silica | 80° C./4 h | 210° C. | 210° C. |
| Example 3 | | 2 wt. % HA | 80° C./4 h | | 212° C. |

The molecular weight for the polymer in Comparative Examples 1-3 and Examples 1-3 was reduced by between 10-20% during processing, as shown in Table 2. The changes in the matrix polymer molecular weight appear to correlate with increases in process temperature and additive amount. Cellulose nanoparticles and hydroxyapatite nanoparticles appeared to promote less decrease in molecular weight than did silica nanoparticles.

TABLE 2

Molecular Weight (Mn) Analysis for Comparative Examples 1-3 and Examples 1-3.

| Sample | Polymer | Additive | Mn |
|---|---|---|---|
| Control | PCL | — | 133,438 |
| Comparative Example 1 | | 1 wt. % silica | 120,602 |
| Comparative Example 2 | | 2 wt. % silica | 112,588 |
| Example 1 | | 2 wt. % CNC | 116,267 |
| Example 2 | | 2 wt. % HA | 115,936 |
| Control | PLA | — | 48,272 |
| Comparative Example 3 | | 1 wt. % silica | 35,636 |
| Example 3 | | 1 wt. % HA | 38,377 |

The particulate sizes and size distribution of Comparative Examples 1-3 and Examples 1-3 were measured by dynamic light scattering using a MALVERN MASTERSIZER 3000. Results are shown in Table 3. Polymer particulates prepared using CNC nanoparticles exhibited reduced $D_{50}$ values in comparison to the polymer particulates incorporating an equivalent mass of HA or silica nanoparticles. Further, increasing the concentration of silica nanoparticles resulted in production of smaller particulates and a corresponding broadening of the span.

TABLE 3

Size Analysis for Comparative Examples 1-3 and Examples 1-3.

| Formulation | | | Size | |
|---|---|---|---|---|
| Sample | Polymer | Additive | $D_{50}$ (µm) | Span |
| Comparative Example 1 | PCL | 1 wt. % silica | 166 | 0.931 |
| Comparative Example 2 | | 2 wt. % silica | 151 | 1.176 |
| Example 1 | | 2 wt. % CNC | 89.3 | 1.624 |
| Example 2 | | 2 wt. % HA | 132 | 1.115 |
| Comparative Example 3 | PLA | 1 wt. % silica | 57.1 | 0.99 |
| Example 3 | | 1 wt. % HA | 67.2 | 1.18 |

Polymer particulates were also characterized by scanning electron microscopy (SEM). FIGS. 2A to 2D show SEM micrographs of Comparative Example 2, polycaprolactone polymer particulates prepared with silica nanoparticles. PCL particulates with silica nanoparticles showed a bimodal distribution with a significant population of small particulates. Some irregular shaped particulates were seen in the SEM micrographs, and silica nanoparticles were distributed on the surface of the particulates. No silica nanoparticles were observed in the cross-section image in FIG. 2D.

FIGS. 3A to 3D show SEM micrographs of Example 1, polycaprolactone polymer particulates prepared with crystalline nanocellulose nanoparticles. Particulates containing CNC showed a relatively narrow size distribution with some elongated particulates present. SEM indicated that CNC nanoparticles were well dispersed on the surface of the polymer particulates. CNC nanoparticles were also present inside the particulates, as shown in the cross-section image in FIG. 3D.

FIGS. 4A to 4D show SEM micrographs of Example 2, polycaprolactone polymer particulates prepared with hydroxyapatite nanoparticles. Example 2 particulates exhibited an acceptable size distribution with a few irregular shaped particulates being observed. HA nanoparticles were well dispersed on the surface of the polymer particulates. HA nanoparticles were also present inside the particulates, as shown in the cross-section image in FIG. 4D. FIGS. 5A to 5D show SEM micrographs of Comparative Example 3, polylactic acid polymer particulates prepared with silica nanoparticles. Comparative Example 3 particulates exhibited a somewhat bimodal size distribution, and the silica nanoparticles were well-distributed on the surface of the polymer particulates. No silica nanoparticles were present on the interior, as shown in the cross-section image in FIG. 5D.

FIGS. 6A to 6D show SEM micrographs of Example 3, polylactic acid polymer particulates prepared with hydroxyapatite nanoparticles. Example 3 particulates exhibited a somewhat bimodal particulate size distribution. The surface of the polymer particulates exhibited well-distributed hydroxyapatite nanoparticles on the surface, with no nanoparticles visible in the cross-section image of FIG. 6D.

Optical microscopy images of the example samples are shown in FIGS. 7-11, each of which showed good sphericity of the polymer particulates.

Average particulate size was also calculated as shown in Table 4. The average particulate sizes are somewhat lower compared to those calculated by dynamic light scattering, which is likely due to the measurement of aggregates and sample size error.

TABLE 4

Particulates Size Analysis for Comparative Examples 2 to 3 and Examples 1 to 3, as calculated by optical microscopy.

| Sample | Formulation | | Size |
|---|---|---|---|
| | Polymer | Additive | $D_{50}$ (μm) |
| Comparative Example 2 | PCL | 2 wt. % silica | 42 |
| Example 1 | | 2 wt. % CNC | 39 |
| Example 2 | | 2 wt. % HA | 56 |
| Comparative Example 3 | PLA | 1 wt. % silica | 42 |
| Example 3 | | 1 wt. % HA | 40 |

The polymer particulates were also analyzed by DSC per ASTM E794-06(2018) as shown in Table 5. The DSC data suggest that nanoparticles may act as nucleating agents promoting the crystallization of the polymers and increasing the observed crystallization temperature (Tc1). Additive manufacturing methods may be improved with relatively fast and controlled crystallization, which may impact a number of mechanical properties. Example 3 was an unusual case in which the interaction between the CNC nanoparticles and PCL seemed to reduce the flexibility of the macromolecular chains, leading to slower crystallization kinetics. However, the crystallization kinetics remained relatively fast for additive manufacturing applications, and also exhibited an increased sintering temperature window (ΔT).

TABLE 5

Differential Scanning Calorimetry Results.

| Sample | Additive | Tc1 (° C.) | Tm1 (° C.) | Sintering Window ΔT (Tm1 − Tc1) |
|---|---|---|---|---|
| PCL Control | — | 18.82 | 58.81 | 39.99 |
| Comparative Example 1 | 1 wt. % silica | 20.90 | 61.22 | 40.32 |
| Comparative Example 2 | 2 wt. % silica | 27.37 | 59.31 | 31.94 |
| Example 1 | 2 wt. % CNC | 7.71 | 60.06 | 52.35 |
| Example 2 | 2 wt. % HA | 29.37 | 59.18 | 29.81 |
| PLA Control | — | — | 177.36 | — |
| Comparative Example 3 | 1 wt. % silica | 149.6 | 173.66 | 24.06 |
| Example 3 | 1 wt. % HA | 149.75 | 174.5 | 24.75 |

Angle of Repose measurements are shown in Table 6. Almost all samples exhibited a value <30.0°, which corresponds to excellent flow properties. The only exception was the PLA sample containing silica nanoparticles, which had a value of 34.0°, still corresponding to good flow.

TABLE 6

Angle of Repose Data.

| Sample | Polymer | Additive | AoR (°) |
|---|---|---|---|
| Comparative Example 2 | PCL | 2 wt. % silica | 28.5 |
| Example 1 | | 2 wt. % CNC | 26.3 |
| Example 2 | | 2 wt. % HA | 27.7 |
| Comparative Example 5 | PLA | 1 wt. % silica | 34.0 |
| Example 6 | | 1 wt. % HA | 27.5 |

Samples were also performance tested in selective laser sintering (SLS). During testing, all sample powders exhibited good flow and formed uniform coatings in the SLS testing experiments. Results for polymer mass and void percentage are shown in Table 7. There were no soft aggregates and no blocking after the heating cycles. Also, no to very little powder adhered onto the back of the printed layers. Example 1 particulates required less laser power for successful sintering (20%), compared to those of Comparative Example 2 or Example 2 (~30%, respectively). Some edge curl during cooling was observed (Comparative Ex. 2<Ex. 2<Ex. 1). Single layer porosity was very low (Ex. 1<Ex. 2<Comparative Ex. 2). Some surface texture was observed on samples with silica and HA. FIG. 12 shows optical microscopy images of sintered single layers prepared from polymer particulates prepared in Comparative Example 2, and Examples 1 and 2.

TABLE 7

SLS Summary Data

| Laser Power (%) | Scan Rate | Temp. (° C.) | Mass (g) | | | Voids (%) | | |
|---|---|---|---|---|---|---|---|---|
| | | | Comparative Ex. 2 2 wt. % silica | Ex. 1 2 wt. % CNC | Ex. 2 2 wt. % HA | Comparative Ex. 2 2 wt. % silica | Ex. 1 2 wt. % CNC | Ex. 2 2 wt. % HA |
| 20 | 40000 | 40 | — | 0.0810 | — | — | 0.36 | — |
| 25 | 40000 | 40 | Pieces | 0.1070 | Pieces | — | 0.03 | — |
| 30 | 40000 | 40 | 0.1683 | 0.1310 | 0.1287 | 1.99 | 0.03 | 1.08 |
| 35 | 40000 | 40 | 0.1749 | 0.1774 | 0.1603 | 1.00 | 0.00 | 0.55 |
| 40 | 40000 | 40 | 0.1883 | 0.1695 | 0.1746 | 0.20 | 0.00 | 0.23 |

TABLE 7-continued

SLS Summary Data

| Laser Power (%) | Scan Rate | Temp. (° C.) | Mass (g) | | | Voids (%) | | |
|---|---|---|---|---|---|---|---|---|
| | | | Comparative Ex. 2 2 wt. % silica | Ex. 1 2 wt. % CNC | Ex. 2 2 wt. % HA | Comparative Ex. 2 2 wt. % silica | Ex. 1 2 wt. % CNC | Ex. 2 2 wt. % HA |
| 45 | 40000 | 40 | 0.1883 | 0.1852 | 0.2007 | 0.09 | 0.00 | 0.31 |
| 50 | 40000 | 40 | 0.2060 | 0.2084 | 0.2228 | 0.06 | 0.00 | 0.54 |
| 55 | 40000 | 40 | 0.2073 | — | 0.2413 | 0.01 | — | 0.09 |

Figure 13:
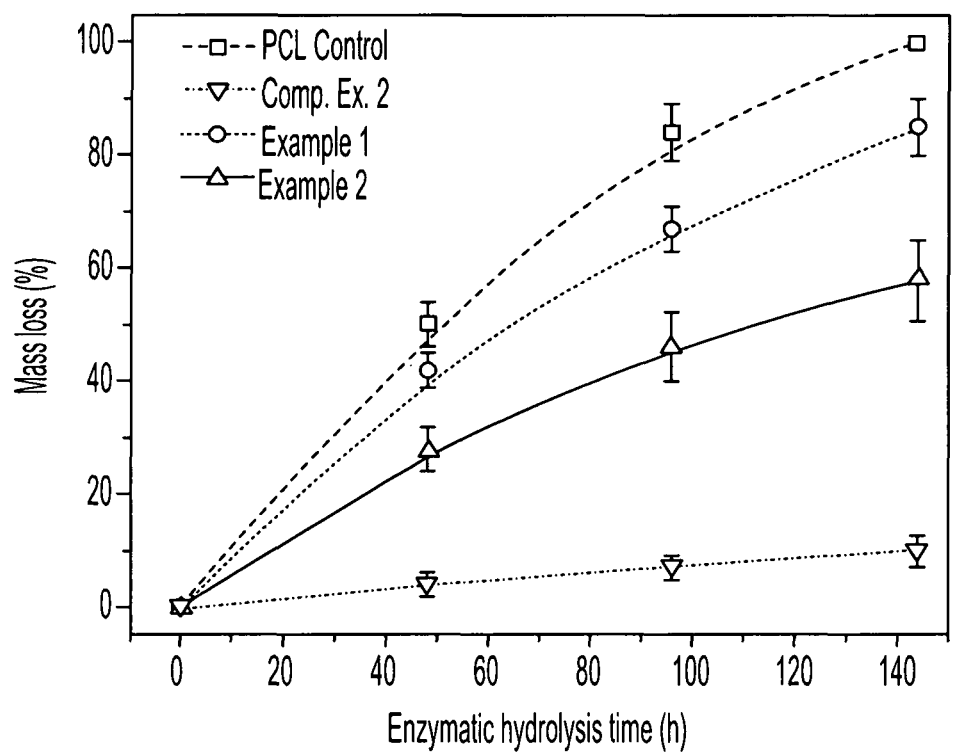
FIG. 13 is a graph showing mass loss as a function of enzymatic hydrolysis for a number of polymer particulates prepared in accordance with the present disclosure.

Biodegradability was also tested by exposing samples to a buffered solution of lipase enzymes. Comparative Example 2 and Examples 1 and 2 were formed into thin films by pressing ~100 mg of each sample, respectively, with a hydraulic press to form 10×20×0.35 mm³ samples. Each sample was then placed in 5 mL of phosphate buffer solution (0.2 M, pH 7.0) containing 0.2 mg/mL of lipase obtained from *Pseudomonas cepacia* ((≥30 U/mg) and incubated at 37° C. throughout the measurement and hydrolysis was measured over time. Control samples without lipase were also measured and negligible weight loss was observed for 6 days for all control samples. All samples had similar degrees of crystallinity as shown in the DSC data in Table 5. Mass loss of the samples during biodegradation is plotted as a function of time in FIG. 13.

A pure PCL control completely degraded in 6 days. Samples containing nanoparticles had reduced rates of hydrolysis. The hydrophobic silica nanoparticles in Comparative Example 2 appeared to be detrimental to enzymatic hydrolysis. The nanoparticles in Examples 1 and 2 had a much milder effect on hydrolysis resulting in materials retaining similar biodegradation characteristics to the control sample.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is the following:

1. A composition comprising:
   a plurality of polymer particulates comprising a matrix polymer and nanoparticles selected from the group consisting of biopolymer nanoparticles, biomineral nanoparticles excluding biomineralized silica alone, and any combination thereof;
  wherein at least a majority of the polymer particulates are substantially spherical in shape, as specified by having a circularity of about 90% or greater, and the polymer particulates further have a diameter span of about 1.7 or less.

2. The composition of claim 1, wherein the nanoparticles comprise cellulose nanoparticles, hydroxyapatite nanoparticles, or any combination thereof.

3. The composition of claim 2, wherein at least a portion of the cellulose nanoparticles or hydroxyapatite nanoparticles are present within a core of the polymer particulates.

4. The composition of claim 1, wherein the polymer particulates have a $D_{50}$ ranging from about 30 μm to about 130 μm.

5. The composition of claim 1, further comprising:
  oxide nanoparticles disposed upon an outer surface of the polymer particulates.

6. The composition of claim 5, wherein the oxide nanoparticles comprise silica nanoparticles.

7. A method, comprising:
  combining a matrix polymer and a plurality of emulsion stabilizers with a carrier fluid at a heating temperature at or above a melting point or softening temperature of the matrix polymer;
  wherein the matrix polymer and the carrier fluid are substantially immiscible at the heating temperature; and wherein the matrix polymer is biodegradable and/or the plurality of emulsion stabilizers comprise nanoparticles selected from the group consisting of biopolymer nanoparticles, biomineral nanoparticles excluding biomineralized silica alone, and any combination thereof;
  applying sufficient shear to disperse the matrix polymer as liquefied droplets in the presence of the emulsion stabilizers in the carrier fluid at the heating temperature;
  cooling the carrier fluid to at least a temperature at which a plurality of polymer particulates form from the liquefied droplets, the plurality of polymer particulates comprising the matrix polymer and the emulsion stabilizers;
  wherein at least a majority of the polymer particulates are substantially spherical in shape, as specified by having a circularity of about 90% or greater, and the polymer particulates further have a diameter span of about 1.7 or less; and
  separating the polymer particulates from the carrier fluid.

8. The method of claim 7, wherein the nanoparticles comprise cellulose nanoparticles, hydroxyapatite nanoparticles, or any combination thereof.

9. The method of claim 7, wherein the polymer particulates have a $D_{50}$ ranging from about 1 μm to about 130 μm.

10. The composition of claim 1, wherein the matrix polymer comprises a biodegradable matrix polymer;
  wherein the biodegradable matrix polymer loses at least about 40% mass in six days in a phosphate buffer solution (0.2 M, pH 7.0) containing 0.2 mg/ml of lipase obtained from *Pseudomonas cepacia* (≥30 U/mg) and incubated at 37° C.

11. The composition of claim 10, wherein the biodegradable matrix polymer comprises polycaprolactone or polylactic acid.

12. The composition of claim 11, wherein the nanoparticles comprise cellulose nanoparticles, hydroxyapatite nanoparticles, or any combination thereof.

* * * * *